United States Patent
Haneda

(10) Patent No.: US 8,321,659 B2
(45) Date of Patent: Nov. 27, 2012

(54) DATA ENCRYPTION APPARATUS, DATA DECRYPTION APPARATUS, DATA ENCRYPTION METHOD, DATA DECRYPTION METHOD, AND DATA TRANSFER CONTROLLING APPARATUS

(75) Inventor: Terumasa Haneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 916 days.

(21) Appl. No.: 12/003,672

(22) Filed: Dec. 28, 2007

(65) Prior Publication Data

US 2008/0209203 A1    Aug. 28, 2008

(30) Foreign Application Priority Data

Feb. 15, 2007  (JP) .................................. 2007-035432

(51) Int. Cl.
    *H04L 29/06* (2006.01)
(52) U.S. Cl. ....................................................... 713/150
(58) Field of Classification Search .................. 713/150
    See application file for complete search history.

(56) References Cited

U.S. PATENT DOCUMENTS

| | | | | |
|---|---|---|---|---|
| 7,162,643 B1* | 1/2007 | Sankaran et al. | ............. | 713/189 |
| 2002/0083317 A1* | 6/2002 | Ohta et al. | .................... | 713/161 |
| 2002/0191784 A1* | 12/2002 | Yup et al. | ........................ | 380/37 |
| 2003/0048388 A1* | 3/2003 | Lewis et al. | ................... | 348/720 |
| 2005/0220305 A1* | 10/2005 | Fujimoto et al. | .............. | 380/255 |
| 2006/0023877 A1* | 2/2006 | Tsuruga | .......................... | 380/28 |
| 2006/0218190 A1* | 9/2006 | Frost et al. | ................. | 707/104.1 |

FOREIGN PATENT DOCUMENTS

| | | |
|---|---|---|
| JP | 9-008797 | 1/1997 |
| JP | 2000-057005 | 2/2000 |
| JP | 3110572 | 5/2005 |
| JP | 2005-322201 | 11/2005 |
| JP | 2006-033350 | 2/2006 |
| JP | 2006-39000 | 2/2006 |
| JP | 2006-260491 | 9/2006 |
| JP | 2006-330126 | 12/2006 |
| WO | 2005/099412 A2 | 10/2005 |

OTHER PUBLICATIONS

Kazusa Tomonaga et al., "Encryption Disk Array Raid Subsystem", Toshiba Technical Disclosure Bulletin, May 24, 1999, vol. 17-30, pp. 87-95.
Japanese Office Action issued Apr. 15, 2009 in corresponding Japanese Patent Application 2007-035432.

* cited by examiner

*Primary Examiner* — Michael S McNally
(74) *Attorney, Agent, or Firm* — Staas & Halsey LLP

(57) ABSTRACT

A crypt processor is connected to a host computer and a storage apparatus. Data from the host computer is transferred to the crypt processor via DMA (Direct Memory Access) to be encrypted and then stored in the storage apparatus. The crypto processor acquires a descriptor defining a DMA number for identifying a DMA channel used to DMA-transfer the data. The crypto processor stores therein, based on the DMA number included in the acquired descriptor, the data transferred using the same DMA channel in units of a data size specified in a data bus. The crypto processor then encrypts the stored data in units of data size specified in a crypt system, and transfers the encrypted data to the storage apparatus.

6 Claims, 15 Drawing Sheets

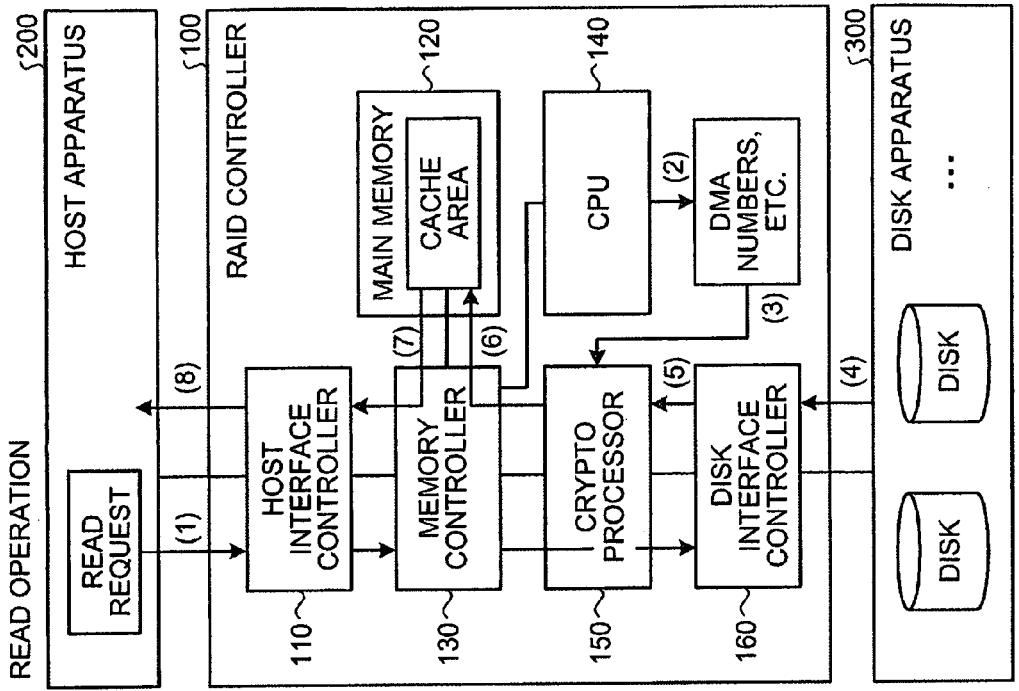
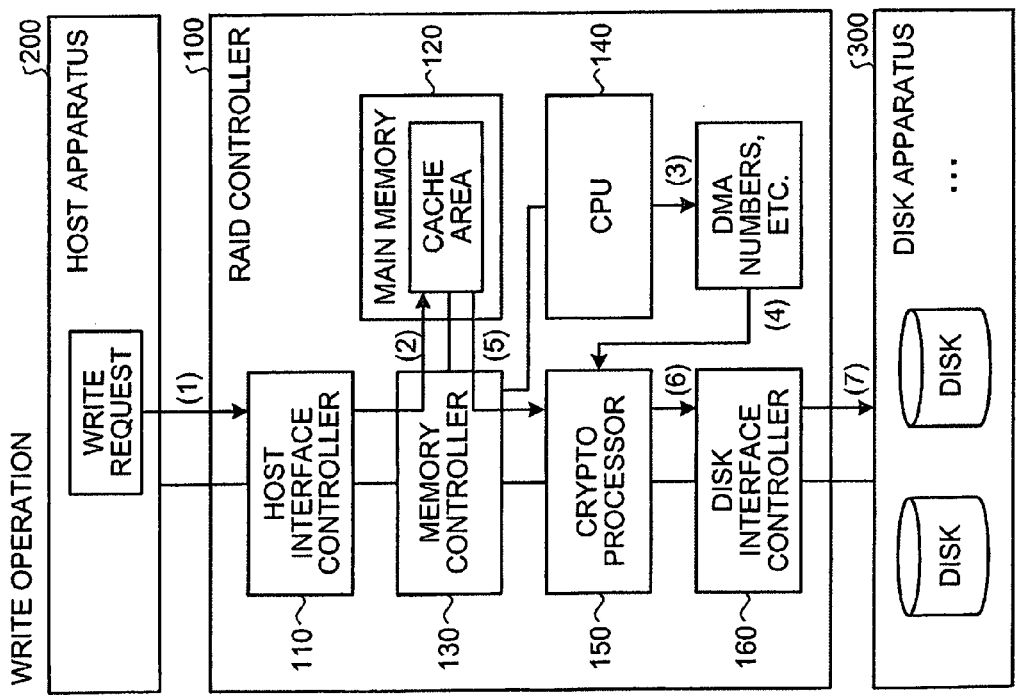

ENCRYPTION
REQUIREMENT FLAG

DATA ENCRYPTION APPARATUS, DATA DECRYPTION APPARATUS, DATA ENCRYPTION METHOD, DATA DECRYPTION METHOD, AND DATA TRANSFER CONTROLLING APPARATUS

BACKGROUND OF THE INVENTION

1. Field of the Invention

The present invention relates to a data encryption apparatus, a data decryption apparatus, a data encryption method, a data decryption method, and a data transfer controlling apparatus that encrypt and decrypt data transferred between a first apparatus and a second apparatus. The present invention particularly relates to a data encryption apparatus, a data decryption apparatus, a data encryption method, a data decryption method, and a data transfer controlling apparatus that are capable of encrypting and decrypting data for each channel by identifying a channel used to transfer the data, even when a data size as a unit for data transfer differs from a data size as a unit for crypto processing.

2. Description of the Related Art

Conventionally, in magnetic disk devices, optical disk devices, and other memory devices, data is encrypted when recorded in storage media (such as magnetic disks and optical disks) or when transmitted to and received from a host apparatus of a network system such as a host computer, for the purpose of preventing information leakage due to theft and unauthorized access. Conventional technologies have been disclosed in, for example, Japanese Patent Applications Laid-Open No. 2005-322201 and No. 2006-39000.

In a computer network system, a typical RAID system (redundant array of inexpensive disks) is well known. The RAID system includes, for example, a disk apparatus of a plurality of disks as storage media, a high-level apparatus that requests to read and write data from and to the disk apparatus, and a RAID controller that controls data input and output to and from the disk apparatus based on the request from the high-level apparatus.

FIGS. 17A and 17B are schematics showing an example of a conventional RAID system. As shown in the schematics, the RAID system includes a RAID controller 10, a host apparatus 20 serving as the high-level apparatus, and a disk apparatus 30. The RAID controller 10 is connected in between the host apparatus 20 and the disk apparatus 30.

The RAID controller 10 includes a host interface controller 11, a main memory 12, a memory controller 13, a central processing unit (CPU) 14, and a disk interface controller 16, as shown in FIGS. 17A and 17B.

The function units will now be briefly described. The host interface controller 11 controls data transfer to and from the host apparatus 20. The main memory 12 includes a cache area used as a cache.

The memory controller 13 controls reading and writing data from and to the main memory 12. The CPU 14 is a central processing unit that implements firmware that controls the entire RAID controller 10. The disk interface controller 16 controls data transfer to and from the disk apparatus 30.

Referring to FIGS. 17A and 17B, an operation performed by the RAID controller 10 is briefly described. The following describes an operation performed when a write request is received from the host apparatus 20 (hereinafter, "write operation"), and an operation performed when a read request is received from the host apparatus 20 (hereinafter, "read operation").

In write operation, as shown in FIG. 17A, when a write request is sent from the host apparatus 20 (reference number (1) in FIG. 17A), the host interface controller 11 receives data sent together with the write request, and passes it to the memory controller 13. The memory controller 13 sequentially stores the received data in the cache area of the main memory 12 (reference number (2) in FIG. 17A). The disk interface controller 16 reads out the data from the cache area via the memory controller 13 (reference number (3) in FIG. 17A), and transfers it to the disk apparatus 30 (reference number (4) in FIG. 17A).

In read operation, on the other hand, as shown in FIG. 17B, when a read request is sent from the host apparatus 20 (reference number (1) in FIG. 17B), the disk interface controller 16 reads out from the disk apparatus 30 data requested in the read request (reference number (2) in FIG. 17B), and passes it to the memory controller 13. The memory controller 13 sequentially stores the received data in the cache area of the main memory 12 (reference number (3) in FIG. 17B). Then, the host interface controller 11 reads out the data from the cache area via the memory controller 13 (reference number (4) in FIG. 17B), and transfers it to the host apparatus 20 (reference number (5) in FIG. 17B).

In such a RAID system, crypto processing (encryption and decryption) is performed on data to be stored in the disk apparatus 30 by the RAID controller 10 in general.

The crypto processing is possibly performed on data transferred between the host apparatus 20 and the main memory 12 and data transferred between the main memory 12 and the disk apparatus 30.

As to the data transferred between the host apparatus 20 and the main memory 12, data to be stored in the main memory 12 is all encrypted. Thus, the data stored in the main memory 12 needs to be decrypted every time it is referred to by the firmware for processing, which means low process efficiency.

Thus, when the RAID controller 10 performs the crypto processing on data to be stored in the disk apparatus 30, it is practical to perform the crypto processing while the data is being transferred between the main memory 12 and the disk apparatus 30.

Such crypto processing is generally realized by embedding processes of the crypto processing in the firmware. The following briefly describes typical crypto processing performed by the firmware.

In write operation, when a write request is sent from the host apparatus 20, the host interface controller 11 receives data sent together with the write request, and passes it to the memory controller 13. The memory controller 13 sequentially stores the received data in the cache area of the main memory 12. The firmware controls the memory controller 13 to sequentially read out the data from the cache area, encrypt it, and save the encrypted data in a save area that is different from the cache area in the main memory 12. Then the disk interface controller 16 reads out the encrypted data from the save area via the memory controller 13, and transfers it to the disk apparatus 30.

In read operation, on the other hand, when a read request is sent from the host apparatus 20, the disk interface controller 16 reads out from the disk apparatus 30 data requested in the read request, and passes it to the memory controller 13. The memory controller 13 sequentially stores the received data in the cache area of the main memory 12. The firmware controls the memory controller 13 to sequentially read out the data stored in the cache area, decrypt it, and save the decrypted data in the save area that is different from the cache area of the main memory 12. The host interface controller 11 reads out the decrypted data from the save area via the memory controller 13, and transfers it to the host apparatus 20.

Accordingly, the firmware performs the crypto processing on data transferred between the main memory 12 and the disk apparatus 30, enabling to encrypt data to be stored in the disk apparatus 30.

Causing the firmware to perform the crypto processing, however, requires the save area to save data temporally before and after the crypto processing as described. This poses a problem of increasing the capacity of a memory (main memory or other memory) to be installed in the RAID controller 10. The increase in memory capacity leads to a cost increase in the RAID controller 10.

In this arrangement, data input and output to and from the disk apparatus always require the crypto processing to be performed by the firmware, which results in an increase in response time for data input and output. Further, because the firmware performs the crypto processing, an increased load is placed on the CPU of the RAID controller 10, causing an increased busy ratio of the disk controlling apparatus and requiring heavy traffic of a main memory bus for the crypto processing. Consequently, the overall RAID system performance declines.

Considering this, suppose the RAID controller 10 is arranged such that an encryption chip capable of realizing encryption and decryption functions by hardware, such as an integrated circuit, is used to perform the crypto processing on data to be stored in the disk apparatus 30, without causing the firmware to perform the crypto processing.

FIGS. 18A and 18B are schematics showing the RAID controller 10 using an encryption chip. In the RAID controller 10, a crypto processor 15 including an encryption chip is connected in between the memory controller 13 and the disk interface controller 16 via a bus, as shown in the schematics.

The following describes an operation performed by the RAID controller 10. In write operation, as shown in FIG. 18A, when a write request is sent from the host apparatus 20 (reference number (1) in FIG. 18A), the host interface controller 11 receives data sent together with the write request, and passes it to the memory controller 13. The memory controller 13 sequentially stores the received data in the cache area of the main memory 12 (reference number (2) in FIG. 18A). Then, the crypto processor 15 sequentially reads out the data from the cache area via the memory controller 13, encrypts the data thus read out, and passes it to the disk interface controller 16 (reference number (3) in FIG. 18A). The disk interface controller 16, when receiving the encrypted data, transfers it to the disk apparatus 30 (reference number (4) in FIG. 18A).

In read operation, on the other hand, as shown in FIG. 18B, when a read request is sent from the host apparatus 20 (reference number (1) in FIG. 18B), the disk interface controller 16 reads out from the disk apparatus 30 data requested in the read request (reference number (2) in FIG. 18B), and passes it to the crypto processor 15. The crypto processor 15 decrypts the received data, and sequentially stores it in the cache area of the main memory 12 via the memory controller 13 (reference number (3) in FIG. 18B). The host interface controller 11 reads out the decrypted data from the cache area via the memory controller 13 ((4) in FIG. 18B), and transfers it to the host apparatus 20 (reference number (5) in FIG. 18B).

When such an encryption chip is used to perform the crypto processing, the save area is not needed. This arrangement solves the problems of the cost increase and processing degradation arising from the crypto processing performed by the firmware.

However, using the encryption chip to perform the crypto processing leads to a problem of requiring complicated control when there is a difference between a data size as a unit for data transfer on a bus connecting the devices in the RAID controller 10 and a data size as a unit for the crypto processing performed by using the encryption chip. This problem is described below in detail.

The following describes, for example, an arrangement in which a peripheral component interconnect express (PCIe) is used as a bus standard and an advanced encryption standard (AES) is used as a format of crypto processing performed by using the encryption chip. In this arrangement, the size as a unit for data transfer on the bus is multiple of 4 bytes (32 bits), and the size as a unit for the crypto processing is 16 bytes (128 bits).

When the AES is used to encrypt data transferred on a PCIe bus, data below 16 bytes may remain without being encrypted (same as in decryption). In this case, the crypto processor 15 holds the remaining data (hereinafter, "fraction data") and combines it with the subsequently transferred data, so as to make and encrypt data over 16 bytes.

In PCIe, data is transferred in the form of a transaction layer packet (TLP), which has a specified upper limit size of data that can be transferred by a single TLP. Thus, when data to be transferred exceeds the upper limit size, the data is separated into a plurality of TLPs and then transferred.

Further, data to be transferred on a bus connecting to the main memory 12 via the memory controller 13 is generally transferred by direct memory access (DMA), aiming to reduce the load on the CPU. DMA allows parallel data transfer using a plurality of DMA channels.

The separate TLPs of one data set are transferred by using the same DMA channel. Thus, when fraction data and the subsequently transferred data are combined, it is necessary to identify whether these data items have been transferred via the same channel.

Each TLP is provided with a header that includes a command of various types (such as read command and write command), an address, and other information. A DMA channel used for data transfer can be identified using Tag information included in the header of the TLP.

In general, how to set information in the Tag area differs depending on the specification of a device (such as the memory controller 13 or the disk interface controller 16) that transfers data. To realize a universal encryption chip independent from the device specification, the Tag information cannot be used as a factor for identifying a DMA channel.

This poses a significant issue regarding how to identify a channel used to transfer data to encrypt and decrypt the data for each channel, even when the data size as a unit for data transfer differs from the data size as a unit for crypto processing.

SUMMARY OF THE INVENTION

It is an object of the present invention to at least partially solve the problems in the conventional technology.

According to an aspect of the present invention, a data encryption apparatus that encrypts data transferred from a first apparatus to a second apparatus, and includes: a transfer information acquiring unit that acquires transfer channel identification information for identifying a channel used to transfer data; a data encrypting unit that stores therein, based on the transfer channel identification information acquired by the transfer information acquiring unit, data transferred via the same channel in a unit of a first data size, and that encrypts the stored data in a unit of a second data size; and a data transferring unit that transfers to the second apparatus the data encrypted in the unit of the second data size by the data encrypting unit.

According to another aspect of the present invention, a data decryption apparatus that decrypts encrypted data transferred from a second apparatus to a first apparatus, and includes a transfer information acquiring unit that acquires transfer channel identification information for identifying a channel used to transfer encrypted data; a data decrypting unit that stores therein, based on the transfer channel identification information acquired at the transfer information acquiring unit, encrypted data transferred via the same channel in a unit of a first data size, and that decrypts the stored encrypted data in a unit of a second data size; and a data transferring unit that transfers to the first apparatus the data decrypted in the unit of the second data size by the data decrypting unit.

According to still another aspect of the invention, a data encryption method that encrypts data transferred from a first apparatus to a second apparatus via a channel, and includes acquiring transfer channel identification information for identifying the channel used to transfer data; storing, based on the transfer channel identification information, data transferred via the same channel in a unit of a first data size, and encrypting the stored data in a unit of a second data size; and transferring to the second apparatus the encrypted data in the unit of the second data size.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are schematics for explaining an overview of a RAID controller according to one embodiment of the present invention;

DETAILED DESCRIPTION OF THE PREFERRED EMBODIMENTS

Figure 2:
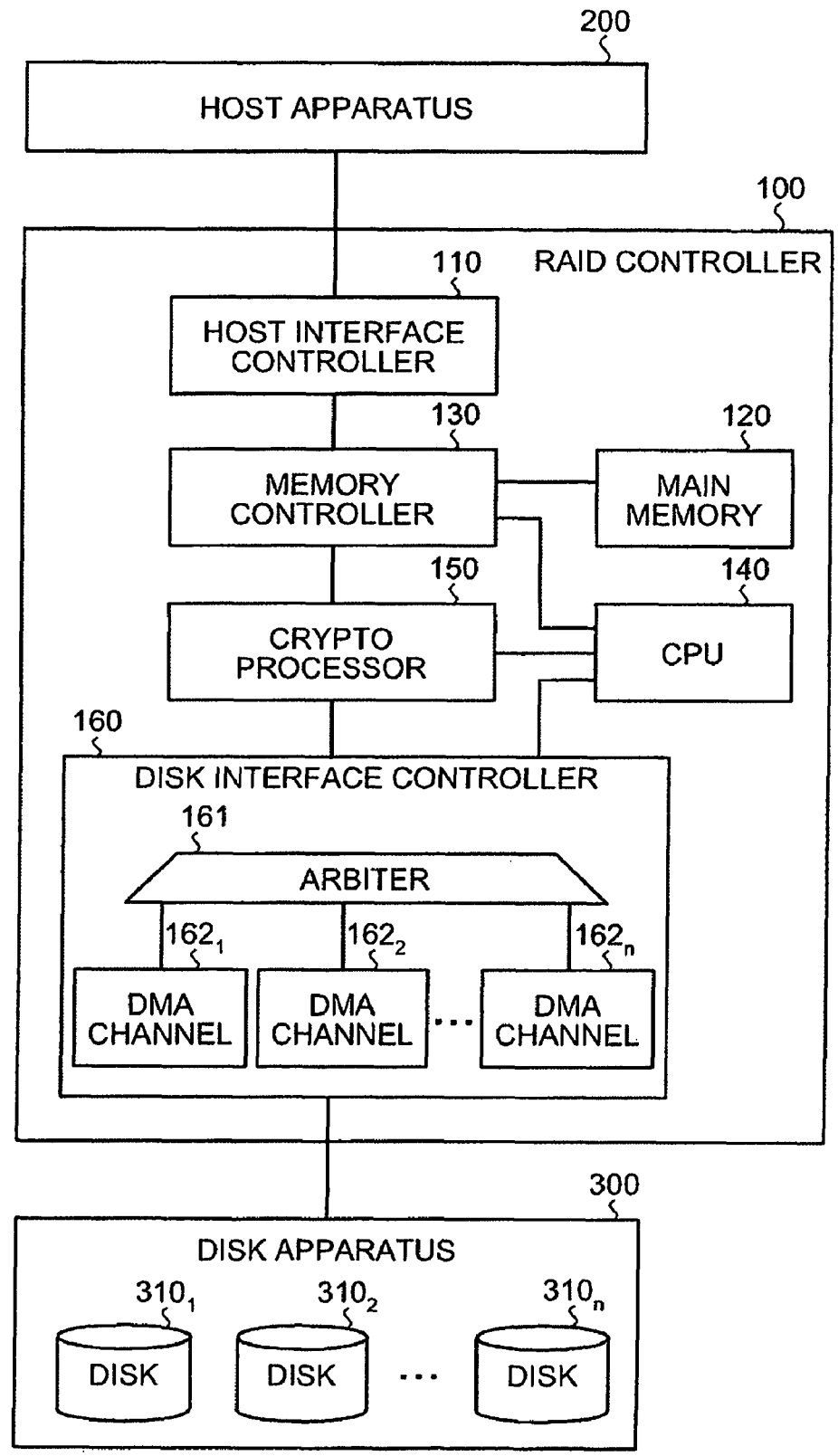
FIG. 2 is a functional block diagram of the RAID controller according to the present embodiment.

An exemplary embodiment of a data encryption apparatus, a data decryption apparatus, a data encryption method, a data decryption method, and a data transfer controlling apparatus according to the present invention will be described in detail with reference to the accompanying drawings. The embodiment describes a RAID controller to which the present invention is applied.

The following describes an overview of the RAID controller according to the present embodiment. FIGS. 1A and 1B are schematics for explaining an overview of the RAID controller according to the present embodiment. As shown in the schematics, a RAID controller 100 is connected to and shared between a host apparatus 200 and a disk apparatus 300. The RAID controller 100 includes a host interface controller 110, a main memory 120, a memory controller 130, a CPU 140, a crypto processor 150, and a disk interface controller 160.

The function units will now be briefly described. The host interface controller 110 controls data transfer to and from the host apparatus 200. The main memory 120 includes a cache area used as a cache. The memory controller 130 controls reading and writing data from and to the main memory 120. The CPU 140 is a central processing unit that implements firmware that controls the entire RAID controller 100. The crypto processor 150 performs crypto processing conforming to the AES by using an encryption chip. The disk interface controller 160 controls data transfer to and from the disk apparatus 300.

The host interface controller 110, the memory controller 130, the crypto processor 150, and the disk interface controller 160 are connected to each other via a PCIe bus. Further, DMA is used for data transfer between the host interface controller 110 and the main memory 120 via the memory controller 130 and for data transfer between the main memory 120 and the disk interface controller 160 via the memory controller 130 and the crypto processor 150.

Accordingly, the RAID controller 100 according to the present embodiment is connected to and shared between the host apparatus 200 serving as a higher-level apparatus and the disk apparatus 300. The RAID controller 100 controls data input and output to and from the disk apparatus 300 based on a request from the host apparatus 200. The RAID controller 100 has such a main feature as being capable of identifying a channel used to transfer data and thereby encrypting and decrypting the data for each channel, even when a data size as a unit for data transfer differs from a data size as a unit for crypto processing.

The following describes this feature in greater detail. As shown in FIG. 1A, in the RAID controller 100 according to the present embodiment, when the host interface controller 110 receives a write request from the host apparatus 200 (reference number (1) in FIG. 1A), it stores data sent together with the write request in the cache area of the main memory 120 via the memory controller 130 (reference number (2) in FIG. 1A).

On the other hand, the firmware (CPU 140) generates control information used to transfer the data stored in the main memory. The control information includes a DMA number for identifying a DMA channel used to transfer the data (reference number (3) in FIG. 1A).

The crypto processor 150 obtains the control information generated by the firmware (reference number (4) in FIG. 1A), and stores therein, based on the DMA number included in the obtained control information, data transferred from the memory controller 130 using the same DMA channel in units of a data size specified in PCIe. The crypto processor 150 then encrypts the stored data in units of a data size specified in the AES (reference number (5) in FIG. 1A).

As a result of encrypting the data, if data below the data size specified in the AES remains, the crypto processor 150 combines the remaining data with data subsequently transferred using the same DMA channel in units of the data size specified in PCIe, so as to encrypt the stored data in units of the data size specified in the AES.

Further, the crypto processor 150 sequentially transfers the encrypted data to the disk interface controller 160 (reference number (6) in FIG. 1A). The disk interface controller 160 transfers the encrypted data, transferred from the crypto processor 150, to the disk apparatus 300 (reference number (7) in FIG. 1A). The data thus transferred is written to a disk that is a storage medium in the disk apparatus 300.

In the RAID controller 100 according to the present embodiment, as shown in FIG. 1B, when the host interface controller 110 receives a read request from the host apparatus 200 (reference number (1) in FIG. 1B), the firmware (CPU 140) generates control information used to transfer the encrypted data read out from the disk apparatus 300 (reference number (2) in FIG. 1B). The control information includes a DMA number for identifying a DMA channel used to transfer the encrypted data.

On the other hand, the disk interface controller 160 reads out from the disk apparatus 300 data requested in the read request (reference number (4) in FIG. 1B), and transfers it to the crypto processor 150 using the same DMA channel in units of the data size specified in PCIe.

The crypto processor 150 obtains the control information generated by the firmware (reference number (3) in FIG. 1B), and stores therein, based on the DMA number included in the obtained control information, the encrypted data transferred from the disk interface controller 160. The crypto processor 150 then decrypts the stored encrypted data in units of the data size specified in the AES (reference number (5) in FIG. 1B).

As a result of decrypting the stored encrypted data, if data below the data size specified in the AES remains, the crypto processor 150 combines the remaining data with data subsequently transferred using the same DMA channel in units of the data size specified in PCIe, so as to store it therein. The crypto processor 150 then decrypts the stored data in units of the data size specified in the AES.

Further, the crypto processor 150 sequentially transfers the decrypted data to the memory controller 130. The memory controller 130 stores the decrypted data, transferred from the crypto processor 150, in the cache area of the main memory 120 (reference number (6) in FIG. 1B). The host interface controller 110 sends the data stored in the cache area to the host apparatus (reference numbers (7) and (8) in FIG. 1B).

Accordingly, in the RAID controller 100 according to the present embodiment, the crypto processor 150 obtains the DMA number for identifying the DMA channel used to transfer the data requested by the host apparatus 200, and stores therein, based on the obtained DMA number, the data transferred using the same DMA channel in units of the data size specified in PCIe. The crypto processor 150 then encrypts the stored data in units of the data size specified in the AES. The encrypted data is transferred by the disk interface controller 160 to the disk apparatus 300.

Further, in the RAID controller 100 according to the present embodiment, the crypto processor 150 obtains the DMA number for identifying the DMA channel used to transfer the encrypted data requested by the host apparatus 200, and stores therein, based on the obtained DMA number, the encrypted data transferred using the same DMA channel in units of the data size specified in PCIe. The crypto processor 150 then decrypts the stored encrypted data in units of the data size specified in the AES. The decrypted data is transferred by the host interface controller 110 to the host apparatus 200.

With this arrangement, the RAID controller 100 according to the present embodiment can identify the DMA channel used for data transfer, thereby enabling encryption and decryption of data for each DMA channel.

The following describes a structure of the RAID controller 100 according to the present embodiment. FIG. 2 is a functional block diagram of the RAID controller 100 according to the present embodiment. As shown in FIG. 2, the RAID controller 100 is connected to and shared between the host apparatus 200 and the disk apparatus 300.

The host apparatus 200 is a higher-level apparatus that writes and reads data to and from the disk apparatus 300. In data write operation, the host apparatus 200 sends a write request to the RAID controller 100, whereas in data read operation, it sends a read request to the RAID controller 100.

The disk apparatus 300 is a storage apparatus that stores therein various kinds of data. The disk apparatus 300 includes a plurality of disks $310_1$ to $310_n$ serving as media for storing data therein and constituted by RAIDs of predetermined types (such as RAIDs 0, 1, 3, and 5).

The RAID controller 100 is a device that controls data input and output to and from the disk apparatus 300 based on a request from the host apparatus 200. The RAID controller 100 includes the host interface controller 110, the disk interface controller 160, the main memory 120, the memory controller 130, the CPU 140, and the crypto processor 150.

As described, the host interface controller 110, the memory controller 130, the crypto processor 150, and the disk interface controller 160 are connected to each other via a PCIe bus. Further, DMA is used for data transfer between the host interface controller 110 and the main memory 120 via the memory controller 130 and for data transfer between the main memory 120 and the disk interface controller 160 via the memory controller 130 and the crypto processor 150.

The function units of the RAID controller 100 will now be described in detail. Data written to the disk apparatus 300 in response to a write request from the host apparatus 200 is referred to as "write data", and data read out from the disk apparatus 300 in response to a read request from the host apparatus 200 is referred to as "read data".

The host interface controller 110 is a processing unit that controls data transfer to and from the host apparatus 200 and data transfer to and from the main memory 120. In write operation, the host interface controller 110, when receiving a write request from the host apparatus 200, stores write data sent together with the write request in the cache area of the main memory 120 via the memory controller 130. In read operation, on the other hand, when receiving a read request from the host apparatus 200, the host interface controller 110 transfers the read request to the memory controller 130.

The main memory 120 serves as a storage device that stores therein programs and data of various kinds. The main memory 120 stores therein firmware that defines procedures of various operations for controlling the entire RAID controller 100, control data necessary to execute the firmware, and other information. Further, the main memory 120 includes the cache area where data transferred from the host apparatus 200 and data transferred from the disk apparatus 300 are temporarily stored, and a predetermined area where control information of descriptors 1 and 2, for example, (described later) is stored.

The memory controller 130 is a processing unit that controls reading and writing data from and to the main memory 120. The memory controller 130, when receiving a write request packet, writes data to the main memory 120 based on the write request packet. Further, the memory controller 130, when receiving a read request packet, reads out data from the main memory 120 based on the read request packet, and sends a read response packet including the data thus read out to the processor having sent the read request packet.

The read request packet and the write request packet are TLPs, each of which has a format specified in PCIe and includes a sequence number, a header, data, and cyclic redundancy check (CRC) codes. The following describes the header of a TLP.

Figure 3:
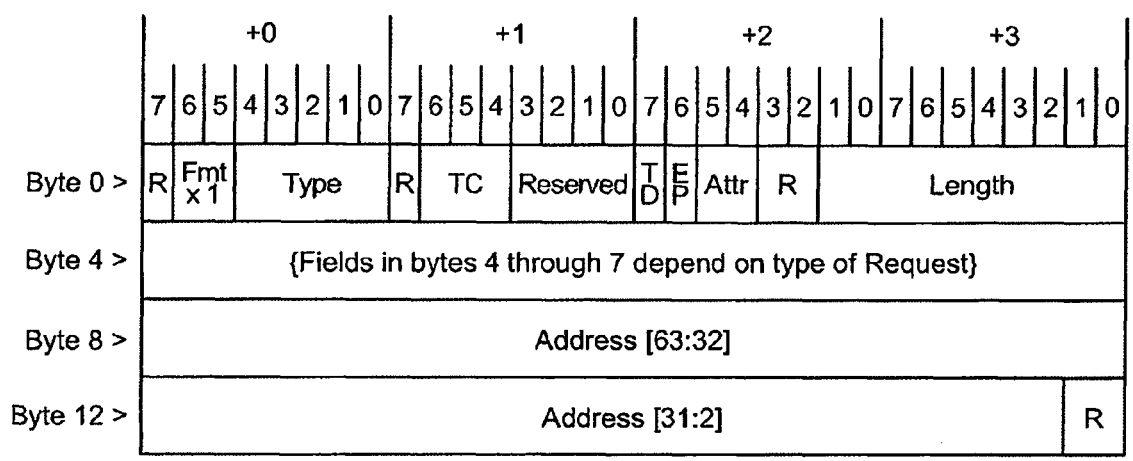
FIG. 3 is a schematic showing the format of the header of a TLP.

FIG. 3 is a schematic showing the format, specified in PCIe, of the header of a TLP. As shown in FIG. 3, the header of the TLP includes various kinds of information for controlling packet transfer and data read and write. As to information specifically related to the embodiment of the present invention, information for identifying a request type, such as a write request or a read request, is assigned in the 5th byte to the 8th byte (see "{Fields in bytes 4 through 7 depend on type of Request}" in FIG. 3). Further, as address information (see "Address" in FIG. 3), a physical address on the main memory 120 from which read data is read out, and a physical address on the main memory 120 to which write data is written are assigned in the 9th to the 16th byte.

PCIe specifies an upper limit size of data that can be requested in a read request packet and in a write request packet, and an upper limit size of data that can be requested in a read response packet. If the data read out from the main memory 120 exceeds the upper limit size acceptable in the read response request, before sending the read response packet, the memory controller 130 separates the data so that each separate data item becomes equal to or less than the upper limit size. In this way, the memory controller 130 sends a read request packet for each separate data item.

Referring back to FIG. 2, the CPU 140 is a central processing unit that controls the entire RAID controller 100 by reading out and executing the firmware stored in the main memory 120. By executing the firmware, the CPU 140 performs various operations for controlling the entire RAID controller 100. The following describes processes performed by the CPU 140, specifically only those related to the embodiment of the present invention.

The CPU 140, when receiving a request such as a write request or a read request from the host apparatus 200 via the host interface controller 110, generates descriptors 1 and 2 based on the received request and stores them in the main memory 120. The descriptors 1 and 2 are control information for controlling reading and writing data from and to the main memory 120. Further, CPU 140 stores the descriptors 1 and 2 in a predetermined area of the main memory 120, and then activates the crypto processor 150 and the disk interface controller 160, which will be described later.

Figure 4:
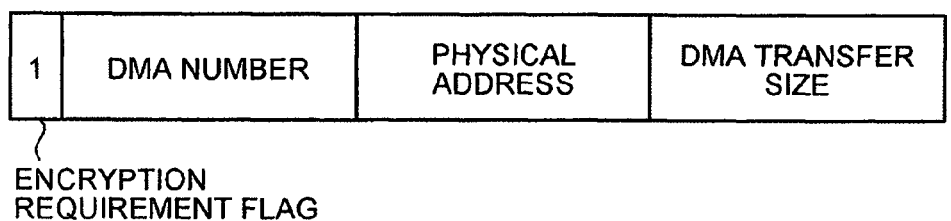
FIG. 4 is a schematic showing the format of a descriptor 1.

The following describes the descriptors 1 and 2 generated by the CPU 140, starting with the descriptor 1. FIG. 4 is a schematic showing the format of the descriptor 1. As shown in FIG. 4, the descriptor 1 includes an encryption requirement flag, a DMA number, a physical address, and a DMA transfer size.

A fixed value of "1" is set in the encryption requirement flag. The DMA number is assigned a number for identifying a DMA channel used for DMA transfer of data requested in a read request or a write request. The physical address is assigned an address on the main memory 120 where data requested by the host apparatus 200 is stored. The DMA transfer size is assigned a size of data requested by the host apparatus 200.

Figure 5:
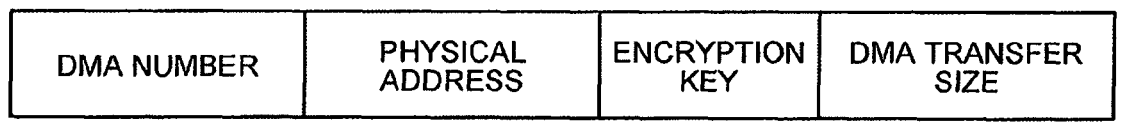
FIG. 5 is a schematic showing the format of a descriptor 2.

The following describes the descriptor 2. FIG. 5 is a schematic showing the format of the descriptor 2. As shown in FIG. 5, the descriptor 2 includes a DMA number, a physical address, an encryption key, and a DMA transfer size. The DMA number, the physical address, and the DMA transfer size are assigned the same values as those set in the descriptor 1. The encryption key is assigned key information used for data encryption and decryption performed by the crypto processor 150, which will be described later.

Referring back to FIG. 2, the disk interface controller 160 is a processing unit that controls data transfer to and from the disk apparatus 300 and DMA transfer to and from the main memory 120. The disk interface controller 160 includes an arbiter 161, and DMA channels $162_1$ to $162_n$. The disk interface controller 160, when activated by the firmware, generates a read request packet for reading out the descriptor 1 from the main memory 120, and sends it to the crypto processor 150.

Figure 6:
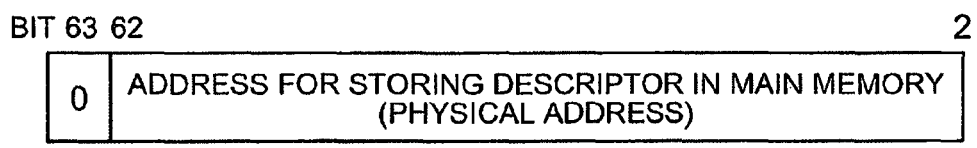
FIG. 6 is a schematic showing address information of a request packet for reading out a descriptor.

To generate a read request packet for the descriptor 1, the disk interface controller 160 sets an encryption requirement flag and a physical address, as the address information in the header of the read request packet. FIG. 6 is a schematic showing address information of a request packet for reading out a descriptor. In FIG. 6, address information included in a read request packet is shown (see "Address" shown in FIG. 3).

Specifically, as shown in FIG. 6, the disk interface controller 160 sets, as the encryption requirement flag, "0 (encryption not required)" to the first 1 bit (bit 63) of the address information, and, as the physical address, a descriptor memory address (here, the memory address of the descriptor 1) on the main memory 120 to the 2nd bit to 62nd bit (bits 62 to 2).

The read request packet for the descriptor 1 thus sent is transferred by the crypto processor 150 to the memory controller 130. The memory controller 130, when receiving this read request packet, reads out the descriptor 1 from the cache area of the main memory 120 and sends it to the disk interface controller 160.

In write operation, the disk interface controller 160, when receiving the descriptor 1 from the memory controller 130, generates a read request packet for reading out write data from the main memory 120 based on the information set in the descriptor 1 and then sends the read request packet to the crypto processor 150.

When the DMA transfer size set in the descriptor 1 exceeds the upper limit size of data that can be requested in the read request packet, the disk interface controller 160 separates the write data so that each separate data item becomes equal to or less than the upper limit size. The disk interface controller 160 then sends a read request packet for each separate data item. Note that the read request packets are sent using the same DMA channel.

Figure 7:
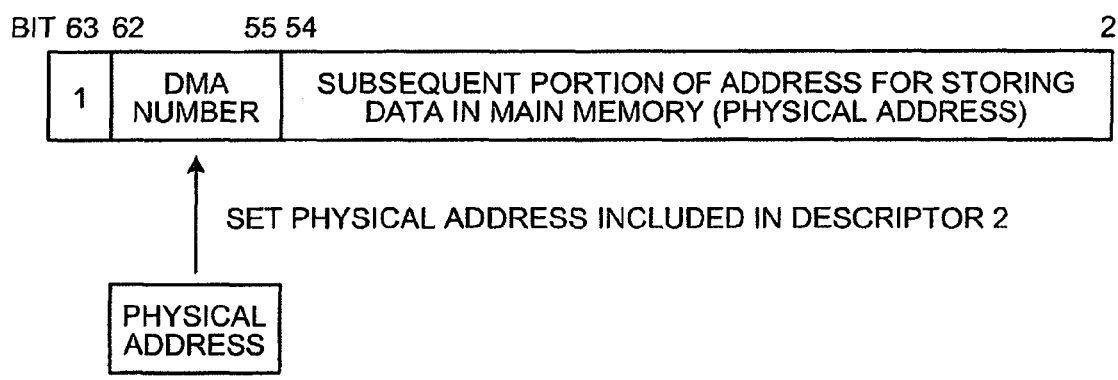
FIG. 7 is a schematic showing address information of a request packet for reading out data.

To generate the read request packets for the data, the disk interface controller 160 sets an encryption requirement flag, a DMA number, and a physical address, as the address information of each of the read request packets. FIG. 7 is a schematic showing the address information of a request packet for reading out data. In FIG. 7, address information included in a read request packet is shown (see "Address" shown in FIG. 3).

Specifically, as shown in FIG. 7, the disk interface controller 160 sets: as the encryption requirement flag, "1 (encryption required)" to the 1st bit (bit 63) of the address information; as the DMA number, a DMA number for identifying a DMA channel used to transfer the read request packet to the 2nd bit to the 9th bit (bits 62 to 55); and as the physical address, bits subsequent to the 9th bit of the address on the main memory 120, to which the write data is to be written, to the 10th bit to the 62nd bit (bits 54 to 2).

While the following describes an arrangement that the DMA number is 8 bit, the digit number for the DMA number is not limited to this and may be suitably determined according to the number of DMA channels.

As to the data read request packet thus sent, the crypto processor 150 converts the DMA number included in the address information to the physical address included in the descriptor 2, and then transfers it to the memory controller 130.

The disk interface controller 160, when receiving the data encrypted by the crypto processor 150 in response to the read request packet thus sent, transfers the encrypted data to the disk apparatus 300.

In read operation, on the other hand, the disk interface controller 160, when receiving the descriptor 1 from the memory controller 130, reads out data from the disk apparatus 300 based on the information set in the descriptor 1. Further, the disk interface controller 160 generates a write request packet for writing the data thus read out to the main memory 120, and sends it to the crypto processor 150.

When the data size read out from the disk apparatus 300 exceeds the upper limit size of data that can be requested in the write request packet, the disk interface controller 160 separates the data so that each separate data item becomes equal to or less than the upper limit size. The disk interface controller 160 then sends a write request packet for each separate data item. Note that the write request packets are sent using the same DMA channel.

To generate the write request packets for the data, the disk interface controller 160 sets an encryption requirement flag, a DMA number, and a physical address, as the address information of each of the write request packets. Specifically, as with the address information of the data read request packet shown in FIG. 7, the disk interface controller 160 sets: as the encryption requirement flag, "1 (encryption required)" to bit 63; as the DMA number, a DMA number for identifying a DMA channel used to transfer the write request packet to bits 62 to 55; and as the physical address, bits subsequent to the 9th bit of the address on the main memory 120, to which the write data is to be written, to bits 54 to 2.

The DMA channels $162_1$ to $162_n$ are transfer channels provided between the disk interface controller 160 and the main memory 120 via the crypto processor 150 and the memory controller 130. The DMA channels are used for DMA transfer of data between the disk interface controller 160 and the memory controller 130. Each DMA channel is identified by a specific DMA number.

The arbiter 161 is a processing unit that selects the DMA channels $162_1$ to $162_n$ used to transfer data, when DMA transfer is performed between the disk interface controller 160 and the memory controller 130. When data is transferred from the disk interface controller 160 to the memory controller 130, the arbiter 161 selects one of the DMA channels $162_1$ to $162_n$, so as to DMA-transfer the data via the selected DMA channel.

Further, the arbiter 161, when receiving data stored in the main memory 120 and DMA transferred via the DMA channels $162_1$ to $162_n$, sends the data to the disk apparatus 300. The arbiter 161 DMA-transfers a plurality of data items in parallel between the disc interface controller 160 and the main memory 120 via the DMA channels.

The crypto processor 150 is a processor that performs crypto processing conforming to the AES by using an encryption chip. Specifically, the crypto processor 150, when activated by the firmware, generates a read request packet for reading out the descriptor 2 from the main memory 120, and sends it to the memory controller 130.

To generate a read request packet for the descriptor 2, the crypto processor 150 sets an encryption requirement flag and a physical address, as address information in the header of the read request packet. Note that the address information in the header is set in the same manner for the descriptor 1, and thus the description is omitted here (see FIG. 6).

The crypto processor 150, when receiving the descriptor 2 from the memory controller 130 in response to the read request packet thus sent for the descriptor 2, stores in its internal memory a DMA number, a physical address, an encryption key, and a DMA transfer size, all included in the descriptor 2.

In write operation, thereafter, the crypto processor 150, when receiving the read request packet from the disk interface controller 160, checks the encryption requirement flag set in address information in the header of the read request packet. If the flag is set to be "1", the crypto processor 150 compares the DMA number set in the address information with the DMA number stored in its internal memory.

If the DMA numbers match, the crypto processor 150 converts the DMA number set in the header to the physical address stored in its internal memory, and then sends the read request packet to the memory controller 130.

In this way, as to the read request packets for the descriptors 1 and 2, the address information is not converted because the encryption requirement flag is "0". As to the read request packet for write data and the write request packet for read data, the address information is converted because the encryption requirement flag is "1".

To send the read request packet with the encryption requirement flag "1", before sending it, the crypto processor 150 stores in its internal memory Tag information set in the header of the read request packet. The crypto processor 150, when receiving a read response packet in response to the read request packet thus sent, compares the Tag information set in the header of the read response packet with the Tag information stored in its internal memory.

Figure 8:
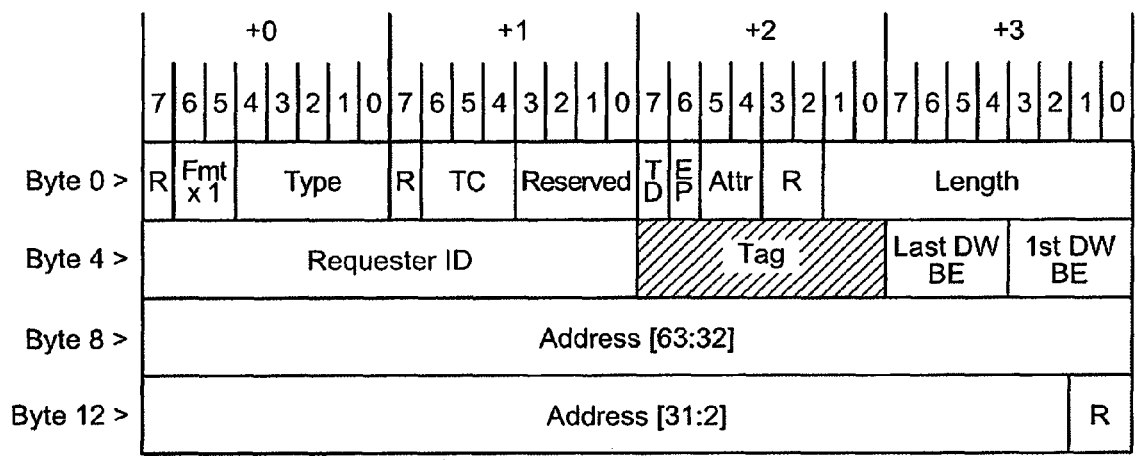
FIG. 8 is a schematic showing the format of the header of a read request packet.
Figure 9:
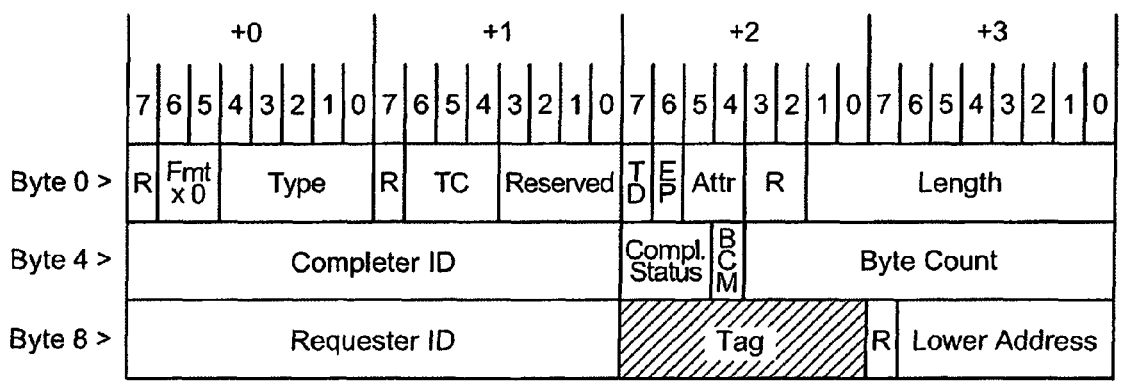
FIG. 9 is a schematic showing the format of the header of a read response packet.
Figure 10:
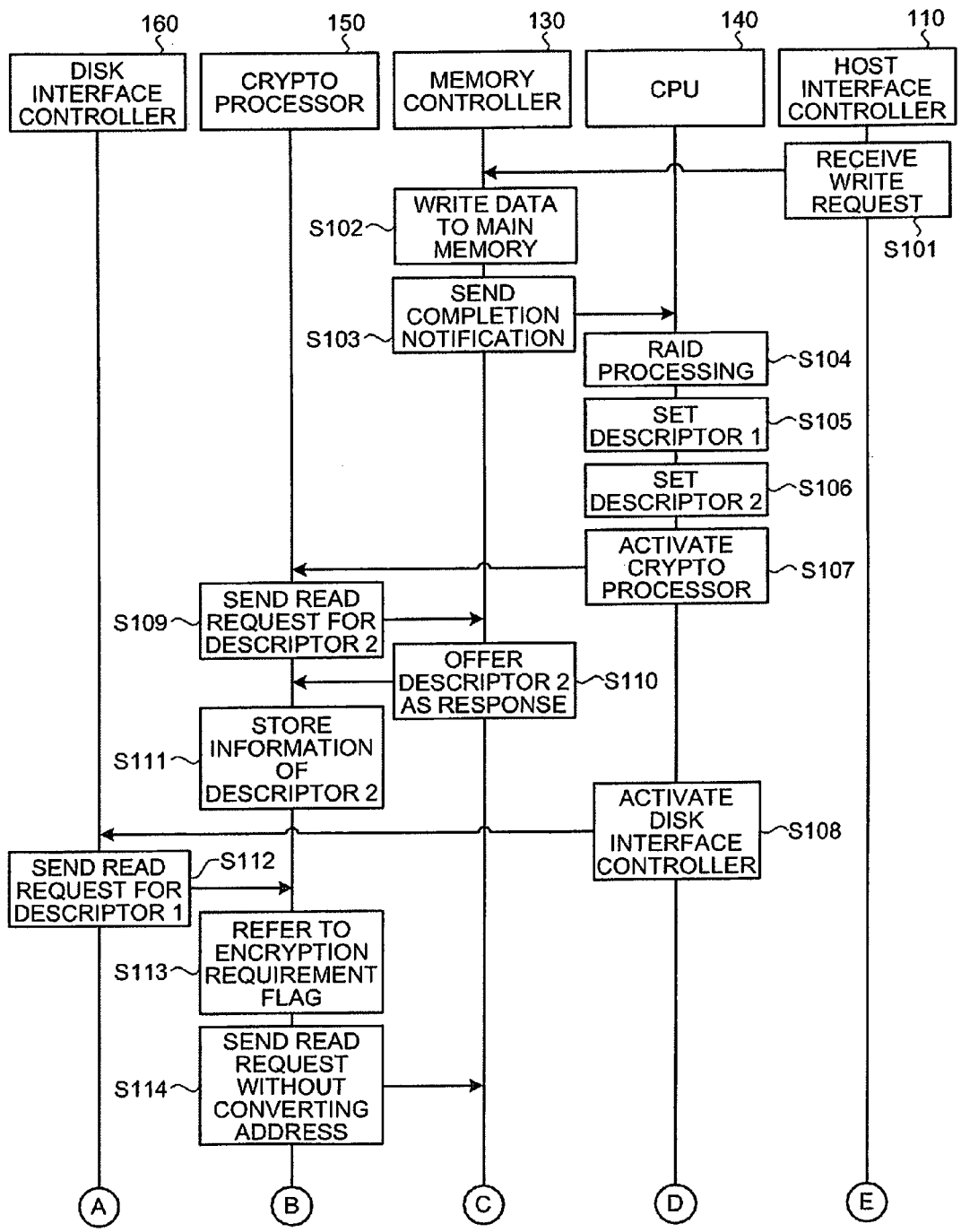
FIG. 10 is a first sequence diagram showing a procedure of processes performed by the RAID controller in write operation.
Figure 11:
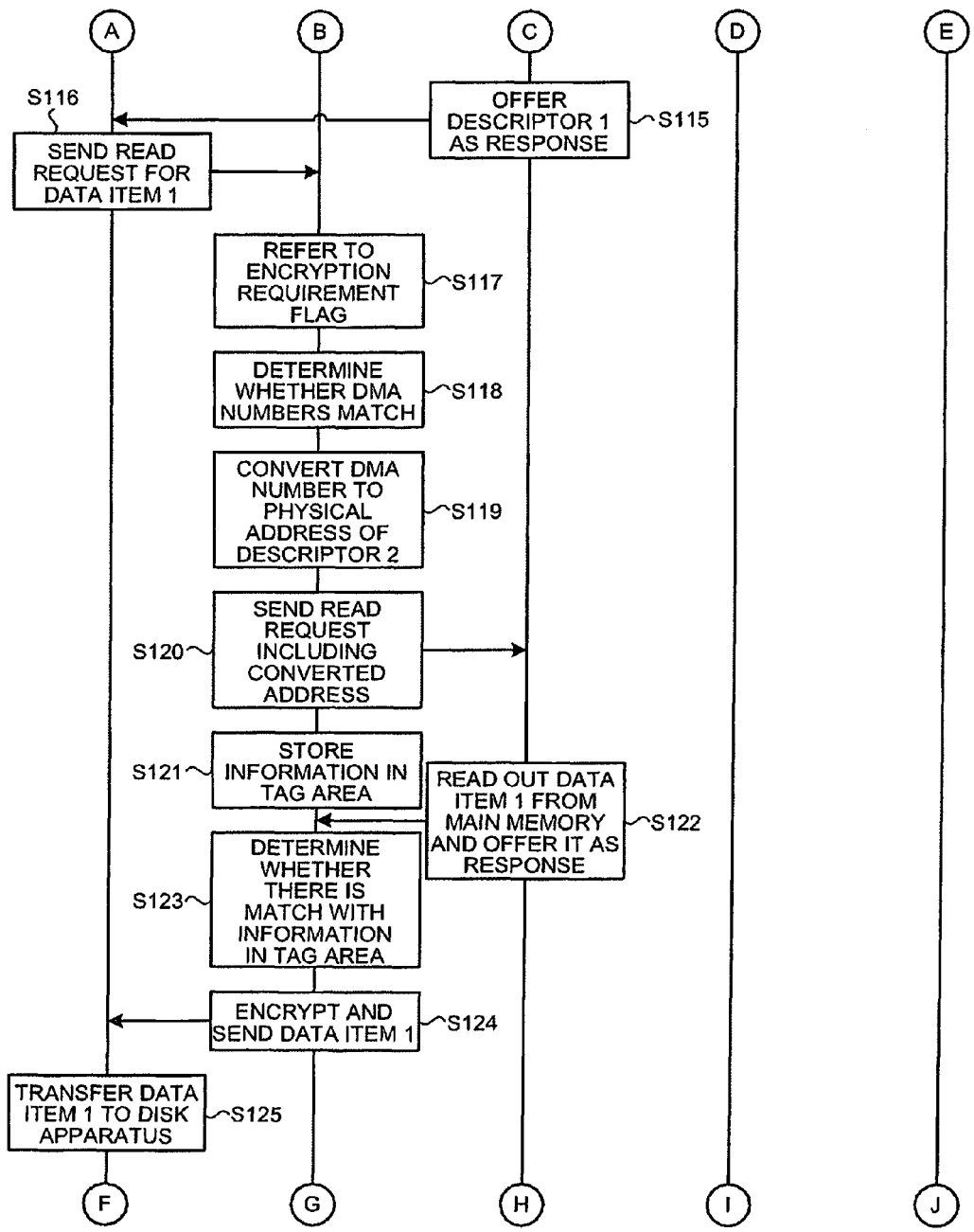
FIG. 11 is a second sequence diagram showing a subsequent procedure of processes performed by the RAID controller in write operation.
Figure 12:
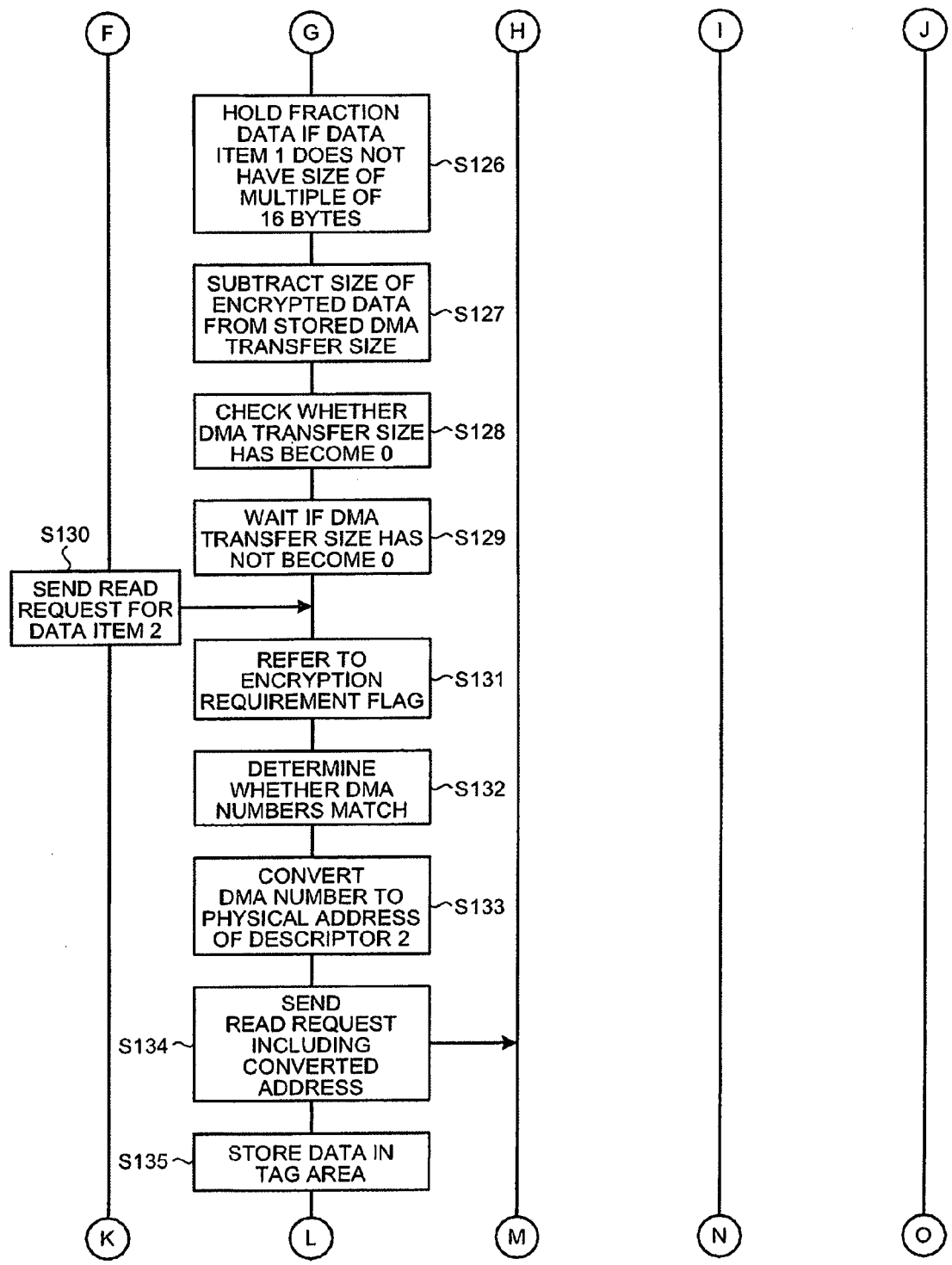
FIG. 12 is a third sequence diagram showing a subsequent procedure of processes performed by the RAID controller in write operation.
Figure 13:
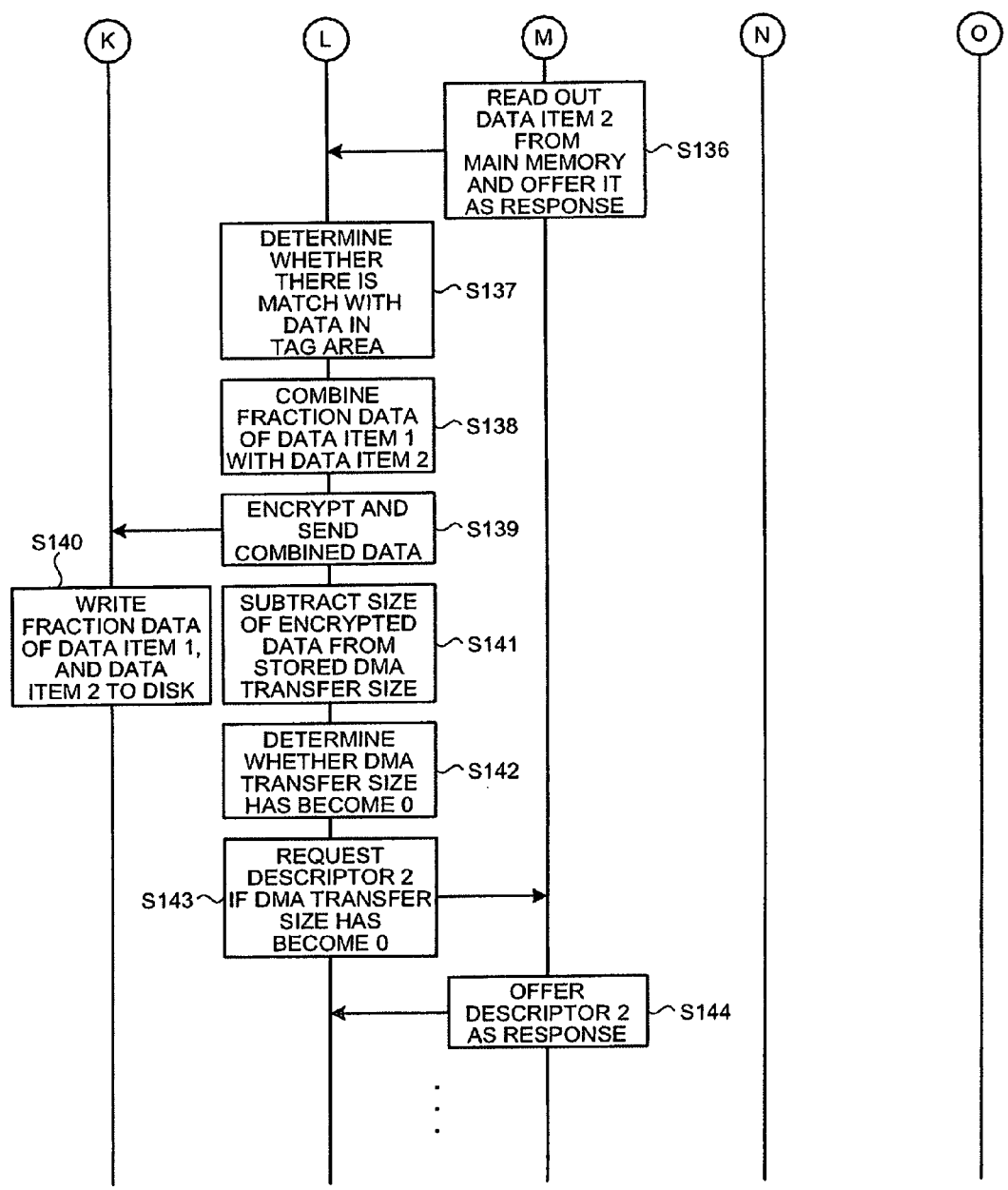
FIG. 13 is a fourth sequence diagram showing a subsequent procedure of processes performed by the RAID controller in read operation.

FIG. 8 is a schematic showing the format, specified in PCIe, of the header of the read request packet. FIG. 9 is a schematic showing the format, specified in PCIe, of the header of a read response packet. As shown in FIGS. 8 and 9, the Tag information is assigned in the 49th bit to the 56th bit in the header of the read request packet, and in the 81st bit to the 88th bit in the header of the read response packet. According to PCIe specification, the same value is set in the Tag information of the read request packet, and in the Tag information of the read response packet generated in response to the read request packet.

As a result of comparing the sets of Tag information, if the values match, the crypto processor 150 encrypts data included in the received read response packet by using the encryption key stored in its internal memory. The crypto processor 150 then sends the encrypted data to the disk interface controller 160.

The crypto processor 150 encrypts the data included in the read response packet in units of a data size specified in the AES (by 16-byte unit). If the data is below 16 bytes, or if data below 16 bytes remains as a result of encrypting the data by a 16-byte unit, the crypto processor 150 holds the remaining data as fraction data in its internal memory.

As described, the read response packet for one data set sent from the memory controller 130 may have been separated to be sent, depending on the upper limit size of data acceptable as a response according to PCIe specification.

The crypto processor 150, when receiving the subsequent read response packet, compares Tag information set in the read response packet with the Tag information stored in its internal memory. If the values match, the crypto processor 150 combines the head of the data included in the received read response packet with the end of the fraction data stored in its internal memory, so as to encrypt the resultant data and send the encrypted data to the disk interface controller 160.

Accordingly, even when receiving read response packets separately, the crypto processor 150 can combine and encrypt data included in the read response packets based on the Tag information.

If data below 16 bytes remains as a result of encrypting data in all the read response packets received separately, the crypto processor 150 holds the remaining data as fraction data in its internal memory.

As described, the read request packet of one data set sent from the disk interface controller 160 may be separated to be sent, depending on the upper limit size of data that can be requested according to PCIe specification.

The crypto processor 150, when receiving the subsequent read request, checks the encryption requirement flag set in address information in the header of the read request packet. If the flag is set to be "1", the crypto processor 150 compares the DMA number set in the address information with the DMA number stored in its internal memory.

If the DMA numbers match, the crypto processor 150 converts the DMA number set in the header to the physical address stored in its internal memory, and then sends the read request packet to the memory controller 130.

Thereafter, the crypto processor 150, when receiving a read response packet from the memory controller 130, encrypts data included in the received read response packet by using the encryption key stored in its internal memory, and sends the encrypted data to the disk interface controller 160.

If the crypto processor 150 has stored fraction data in its internal memory when encrypting the data, it combines the head of the data included in the received read response packet with the end of the fraction data, so as to encrypt the resultant data.

During the processing, the crypto processor 150, every time it encrypts the data, subtracts the size of the encrypted data from the DMA size stored in its internal memory. When the DMA size stored in the internal memory becomes 0, the crypto processor 150 determines that data in all the received read request packets has been encrypted, and sends to the memory controller 130 the next read request for the descriptor 2. The crypto processor 150, when receiving the descriptor 2 as a response, performs write operation based on the descriptor 2 in a similar manner as described.

Accordingly, even when receiving read request packets separately, the crypto processor 150 can combine and encrypt data items requested in the read request packets based on values of the DMA numbers.

In read operation, on the other hand, the crypto processor 150, when receiving a write request packet from the disk interface controller 160, checks the encryption requirement flag set in the address information in the header of the write request packet. If the flag is set to be "1", the crypto processor 150 compares the DMA number set in the address information with the DMA number stored in its internal memory.

If the DMA numbers match, the crypto processor 150 converts the DMA number set in the header to the physical address stored in its internal memory.

The crypto processor 150 decrypts the data included in the write request packet in units of a data size specified in the AES (by 16-byte unit). Further, the crypto processor 150 sets the decrypted data in the write request packet including the converted address, and sends it to the memory controller 130.

If the data included in the received write request packet is below 16 bytes, or if data below 16 bytes remains as a result of decrypting the data by the 16-byte unit, the crypto processor 150 holds the remaining data as fraction data in its internal memory.

As described, the write response packet of one data set sent from the memory controller 130 may be separated to be sent, depending on the upper limit size of data that can be requested conforming to PCIe specification.

The crypto processor 150, when receiving the subsequent read request packet, checks the encryption requirement flag set in address information in the header of the read request packet. If the flag is set to be "1", the crypto processor 150 compares the DMA number set in the address information with the DMA number stored in its internal memory in the same manner as the read request packet received before. If the DMA numbers match, the crypto processor 150 converts the DMA number set in the header to the physical address stored in its internal memory.

The crypto processor 150 combines the head of the data included in the received write request packet with the end of the fraction data stored in its internal memory. Then, the crypto processor 150 decrypts the resultant combined data, sets the decrypted data in the write request packet including the converted address, and sends it to the memory controller 130.

During the processing, the crypto processor 150, every time it encrypts the data, subtracts the size of the encrypted data from the DMA size stored in its internal memory. Accordingly, when the DMA size stored in the internal memory becomes 0, the crypto processor 150 determines that data in all the received write request packets has been encrypted, and sends to the memory controller 130 the next read request for the descriptor 2. Further, the crypto processor 150, when receiving the descriptor 2 as a response, performs read operation based on the descriptor 2 in a similar manner as described.

Accordingly, even when receiving the write request packets separately, the crypto processor 150 can combine and encrypt data items requested in the write request packets based on values of the DMA numbers.

The following describes a procedure of processes performed by the RAID controller 100 according to the present embodiment. First, a procedure of processes performed by the RAID controller 100 in write operation is described referring to FIGS. 10 to 13, and then a procedure of processes performed by the RAID controller 100 in read operation is described referring to FIGS. 14 to 16. The read request packet is simply referred to as "read request", and a write request packet is simply referred to as "write request".

The following describes a procedure of processes performed by the RAID controller 100 in write operation. FIGS. 10 to 13 are sequence diagrams showing a procedure of processes performed by the RAID controller 100 in write operation. As shown in FIGS. 10 to 13, in write operation, when receiving a write request from the host apparatus 200, the host interface controller 110 writes data to the cache area of the main memory 120 via the memory controller 130 (Steps S101, S102).

Upon completion of writing the write data, the memory controller 130 sends a completion notification to the CPU 140 (Step S103). The CPU 140, when receiving the completion notification, performs RAID processing by executing the firmware (Step S104), sets the descriptors 1 and 2 in the main memory 120 (Steps S105, S106), and then activates the crypto processor 150 and the disk interface controller 160 (Steps S107, S108).

The crypto processor 150, when activated by the firmware, sends to the memory controller 130 a read request for the descriptor 2 (Step S109). The memory controller 130, when receiving the read request, reads out the descriptor 2 from the main memory 120 and responds to the crypto processor 150 (Step S110).

The crypto processor 150, when receiving the descriptor 2, stores in its internal memory the DMA number, a physical address, a DMA transfer size, and the like, all included in the descriptor 2 (Step S111).

On the other hand, the disk interface controller 160, when activated by the firmware, sends to the crypto processor 150 a read request for the descriptor 1 (Step S112).

The crypto processor 150, when receiving the read request for the descriptor 1, refers to the encryption requirement flag set in the header of the read request (Step S113). Because the encryption requirement flag is "0", the crypto processor 150 sends the read request to the memory controller 130 without converting the address (Step S114).

The memory controller 130, when receiving the read request, sends the descriptor 1 as a response to the disk interface controller 160 (Step S115). The disk interface controller 160 receives the descriptor 1, and generates a read request for write data. In this embodiment, assuming that the write data exceeds the upper limit size of data that can be requested in the read request, the disk interface controller 160 separates the write data into a data item 1 and a data item 2, and generates read requests for the respective data items.

The disk interface controller 160 first sends the read request for the data item 1 to the crypto processor 150 (Step S116).

The crypto processor 150, when receiving the read request for the data item 1, refers to the encryption requirement flag set in the header of the read request (Step S117). Because the encryption requirement flag is "1" in this embodiment, the crypto processor 150 determines whether the DMA number in the address information matches the DMA number stored in its internal memory (Step S118).

Because the DMA numbers match, the crypto processor 150 converts the DMA number in the address information to the physical address stored in its internal memory (Step S119). The crypto processor 150 then sends the read request including the converted address to the memory controller 130 (Step S120), and stores the Tag information in its internal memory (Step S121).

The memory controller 130 reads out the data item 1 from the main memory 120, and sends to the crypto processor 150 a read response including the data item 1 thus read out (Step S122). Accordingly, the crypto processor 150 determines whether the Tag information set in the header of the received read response matches the Tag information stored in its internal memory (Step S123).

The crypto processor 150 then combines pieces of data included in the read response including matched Tag information, so as to encrypt the data item 1. Further, the crypto processor 150 sends the encrypted data item 1 to the disk interface controller 160 (Step S124).

The disk interface controller 160 receives the data item 1, and transfers it to the disk apparatus 300 (Step S125).

If data below 16 bytes remains as a result of encrypting the data item 1, the crypto processor 150 holds the remaining fraction data in its internal memory (Step S126), and subtracts the size of the encrypted data from the DMA transfer size stored in its internal memory (Step S127).

The crypto processor 150 then determines whether the data transfer size has become 0 (Step S128). If the data transfer size has not become 0, the crypto processor 150 waits for a subsequent read request to be transferred (Step S129).

The disk interface controller 160 sends to the crypto processor 150 a read request for the data item 2 (Step S130), after having sent the read request for the data item 1 at Step S116.

The subsequent processes, i.e., processes from receiving the read request at the crypto processor 150 to receiving a read response including the data item 2 from the memory controller 130 (Steps S131 to S136), are the same as those described in the foregoing processes performed in response to the read request including the data 1 (Steps S117 to S122), and thus their descriptions are omitted here.

The crypto processor 150, when receiving the read response, determines whether the Tag information set in the header of the received read response matches the Tag information stored in its internal memory (Step S137).

The crypto processor 150 then combines fraction data of the data item 1 stored in its internal memory with data included in the read response including matched Tag information (Step S138), so as to encrypt the fraction data of the data item 1, and the data item 2. Further, the crypto processor 150 sends to the disk interface controller 160 the encrypted data (the fraction data of the data item 1, and the data item 2) (Step S139).

The disk interface controller 160 receives the fraction data of the data item 1, and the data item 2, and transfers them to the disk apparatus 300 (Step S140).

The crypto processor 150 subtracts the size of the encrypted data from the DMA transfer size stored in its internal memory (Step S141). In this embodiment, assume that no fraction data remains as a result of encrypting the fraction data of the data item 1, and the data item 2.

The crypto processor 150 then determines whether the data transfer size has become 0 (Step S142). If the data transfer size has become 0, the crypto processor 150 sends the next read request for the descriptor 2 (Step S143). Further, when the descriptor 2 is received as a response from the memory controller 130 (Step S144), the RAID controller 100 performs the same processes as those subsequent to Step S111.

Figure 14:
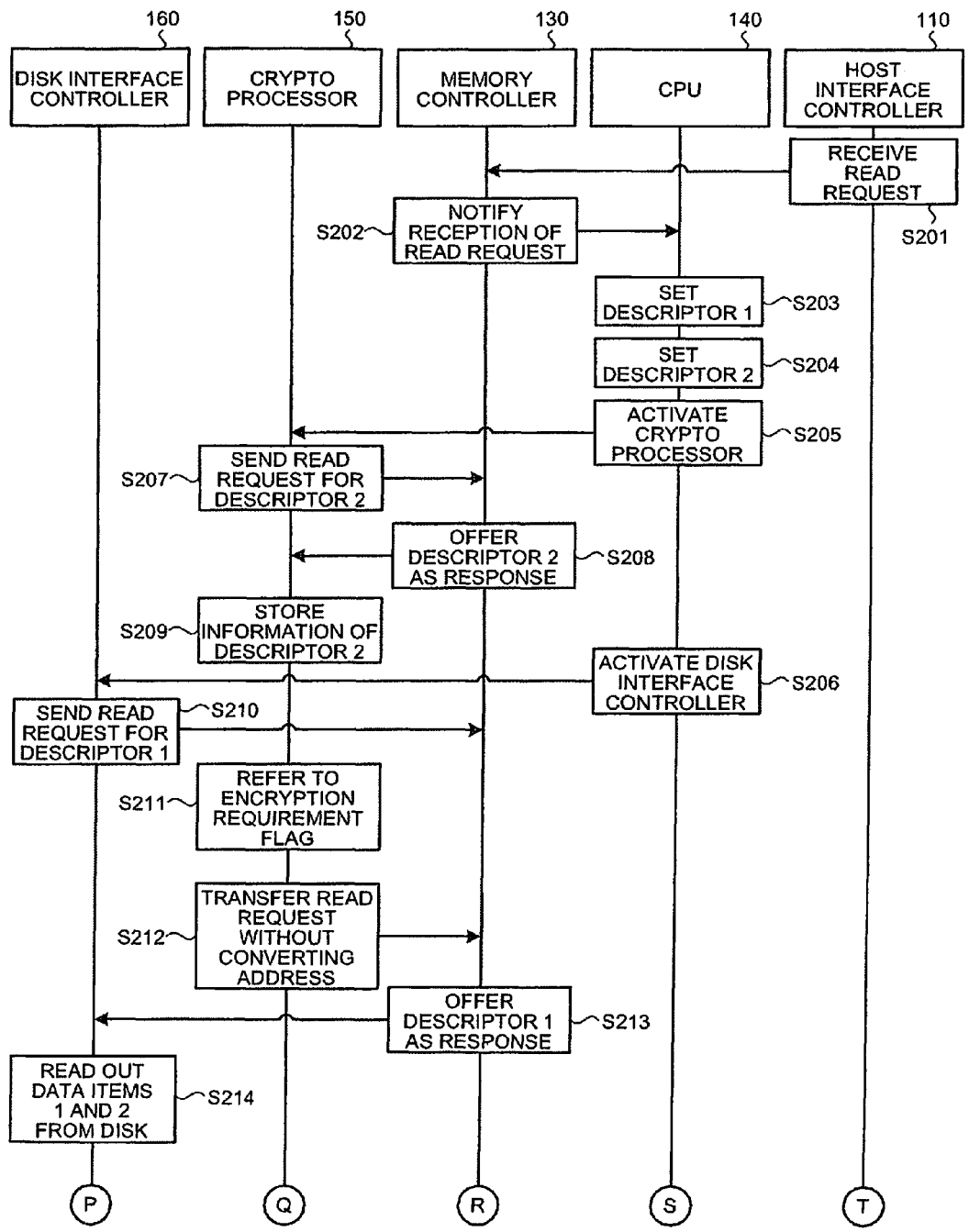
FIG. 14 is a first sequence diagram showing a procedure of processes performed by the RAID controller in read operation.
Figure 15:
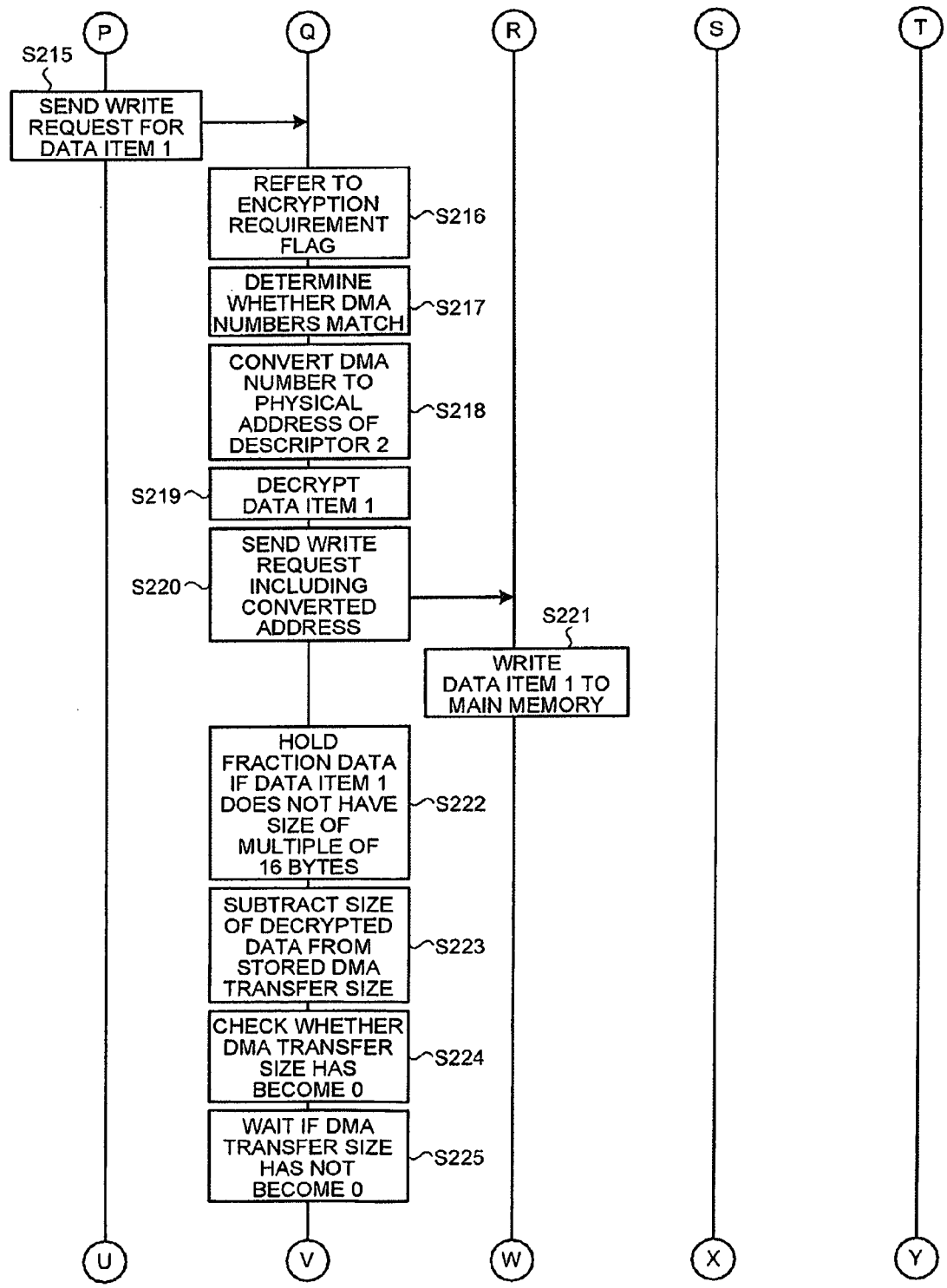
FIG. 15 is a second sequence diagram showing a subsequent procedure of processes performed by the RAID controller in read operation.
Figure 16:
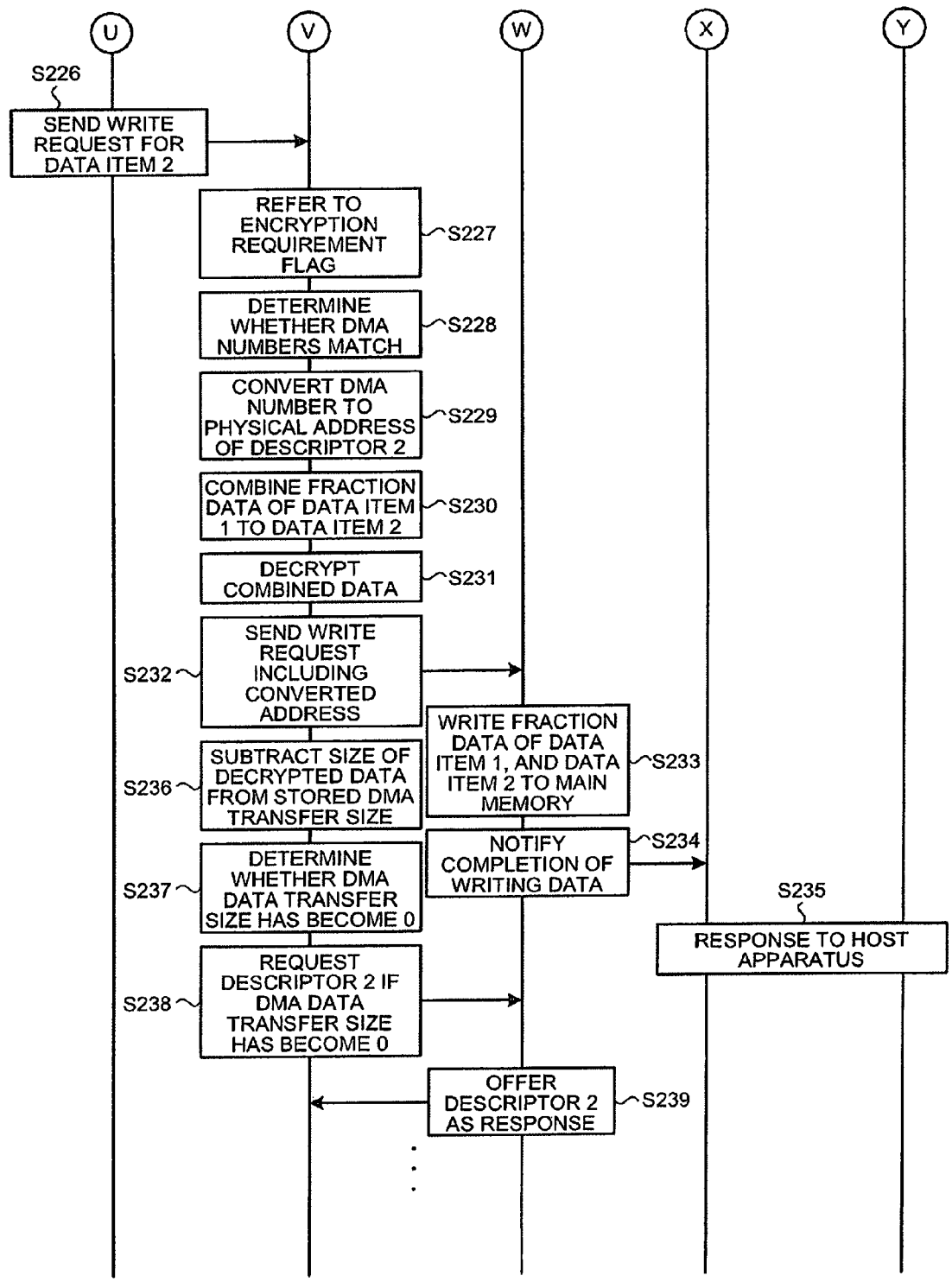
FIG. 16 is a third sequence diagram showing a subsequent procedure of processes performed by the RAID controller in read operation.
Figure 17B:
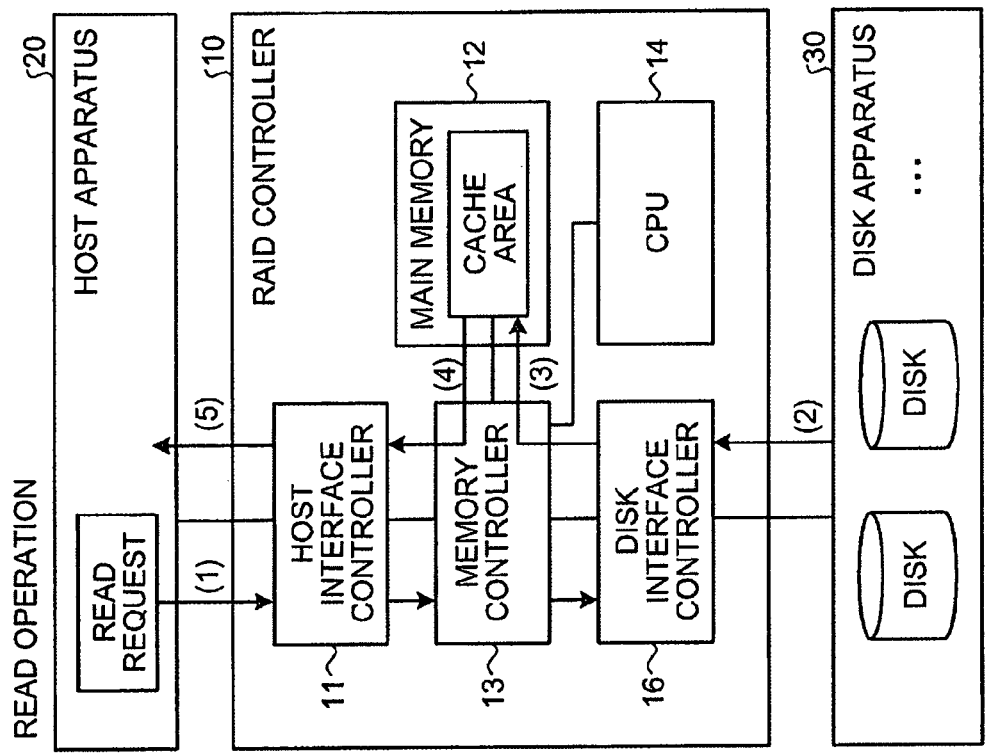
FIGS. 17A and 17B are schematics showing an example of a conventional RAID system.
Figure 17A:
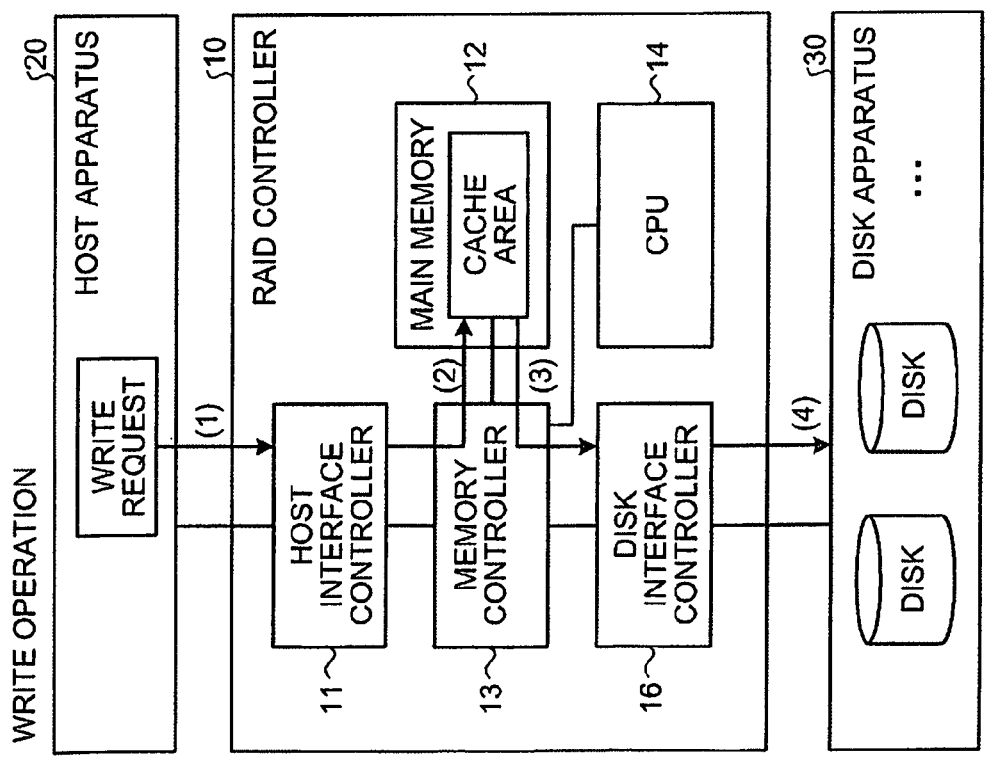
Figure 18A:
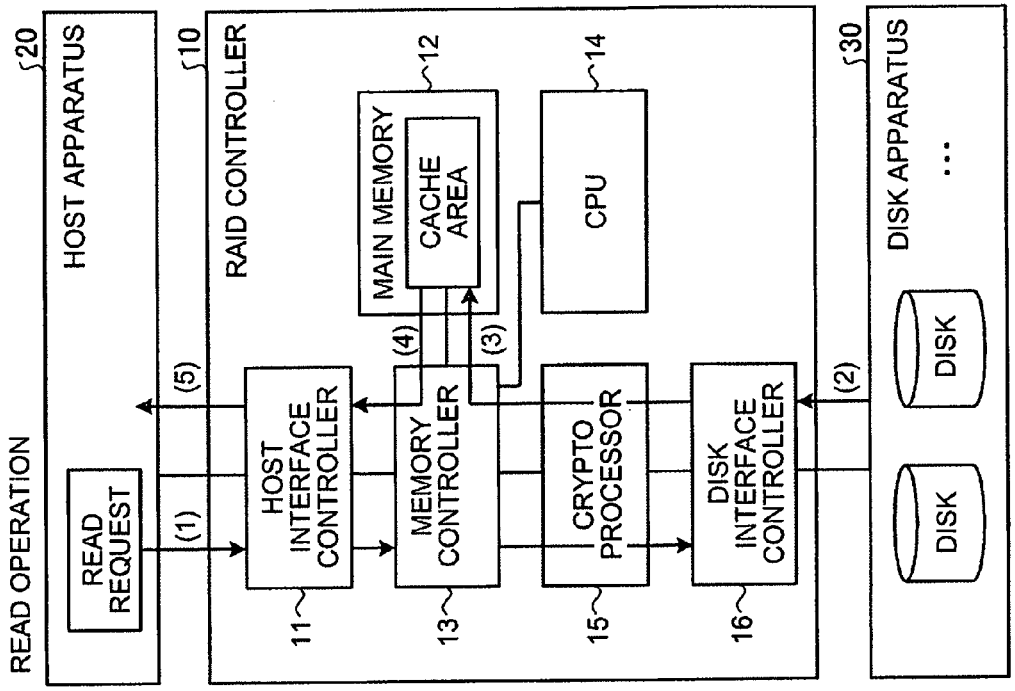
FIGS. 18A and 18B are schematics showing a RAID controller using an encryption chip.
Figure 18B:
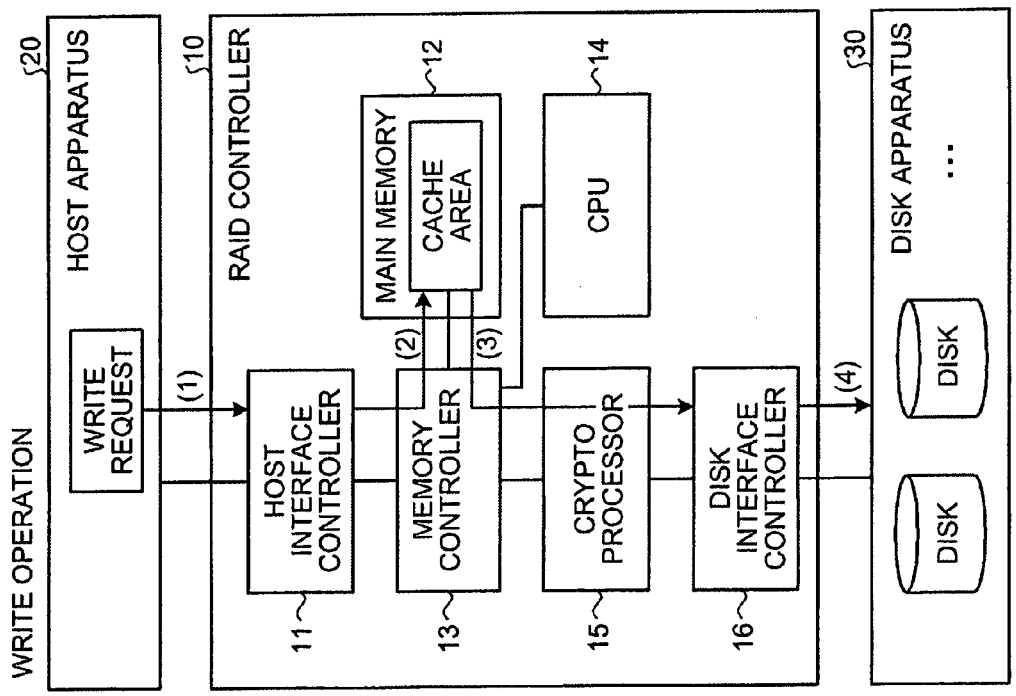

The following describes a procedure of processes performed by the RAID controller 100 in read operation, dealing with reading of the data (the data items 1 and 2) transferred to the disk apparatus 300 in the write operation. FIGS. 14 to 16 are sequence diagrams showing a procedure of processes performed by the RAID controller 100 in read operation. As shown in FIGS. 14 to 16, in read operation, when the host interface controller 110 receives a read request from the host apparatus 200, it transfers a read request to the memory controller 130 (Step S201).

The memory controller 130, when receiving the read request, notifies the CPU 140 about the receipt of the read request (Step S202). The CPU 140, when receiving the receipt notification, sets the descriptors 1 and 2 in the main memory 120 by executing the firmware (Steps S203, S204), and then activates the crypto processor 150 and the disk interface controller 160 (Steps S205, S206).

The crypto processor 150, when activated by the firmware, sends to the memory controller 130 a read request for the descriptor 2 (Step S207). The memory controller 130, when receiving the read request, reads out the descriptor 2 from the main memory 120 and offers it as a response to the crypto processor 150 (Step S208).

The crypto processor 150, when receiving the descriptor 2, stores in its internal memory a DMA number, a physical address, a DMA transfer size, and the like, all included in the descriptor 2 (Step S209).

On the other hand, the disk interface controller 160, when activated by the firmware, sends to the crypto processor 150 a read request for the descriptor 1 (Step S210).

The crypto processor 150, when receiving the read request for the descriptor 1, refers to the encryption requirement flag set in the header of the read request (Step S211). Because the encryption requirement flag is "0", the crypto processor 150 sends the read request to the memory controller 130 without converting the address (Step S212).

The memory controller 130, when receiving the read request, sends the descriptor 1 as a response to the disk interface controller 160 (Step S213). The disk interface controller 160 receives the descriptor 1, and reads out the data items 1 and 2 from the disk apparatus 300 (Step S214).

The disk interface controller 160 generates a write request for the data items 1 and 2 thus read out. In this embodiment, assuming that the total size of the data items 1 and 2 exceeds the upper limit size of data that can be requested in the read request, the disk interface controller 160 generates read requests for the respective data items 1 and 2.

The disk interface controller 160 first sends the write request for the data item 1 to the crypto processor 150 (Step S215).

The crypto processor 150, when receiving the write request for the data item 1, refers to the encryption requirement flag set in the header of the write request (Step S216). Because the encryption requirement flag is "1" in this embodiment, the crypto processor 150 determines whether the DMA number in the address information matches the DMA number stored in its internal memory (Step S217).

Because the DMA numbers match, the crypto processor 150 converts the DMA number in the address information to the physical address stored in its internal memory (Step S218). Further, the crypto processor 150 decrypts the data item 1 (Step S219), sets the decrypted data item 1 in the write request including the converted address, and sends the write request to the memory controller 130 (Step S220). Accordingly, the memory controller 130 receives the write request, and writes the write data item 1 to the main memory 120 (Step S221).

If fraction data below 16 bytes remains as a result of decrypting the data item 1, the crypto processor 150 holds the remaining fraction data in its internal memory (Step S222). Further, the crypto processor 150 subtracts the size of the decrypted data from the DMA transfer size stored in its internal memory (Step S223).

The crypto processor 150 then determines whether the data transfer size has become 0 (Step S224). If the data transfer size has not become 0, the crypto processor 150 waits for a subsequent write request to be transferred (Step S225).

The disk interface controller 160 sends to the crypto processor 150 a write request for the data item 2 (Step S226), after having sent the write request for the data item 1 at Step S215.

The crypto processor 150, when receiving the write request for the data item 2, refers to the encryption requirement flag set in the header of the write request (Step S227). Because the encryption requirement flag is "1" in this embodiment, the crypto processor 150 determines whether the DMA number in the address information matches the DMA number stored in its internal memory (Step S228).

Because the DMA numbers match, the crypto processor 150 converts the DMA number in the address information to the physical address stored in its internal memory (Step S229). Further, the crypto processor 150 combines the fraction data of the data item 1 with the data item 2 both stored in its internal memory (Step S230), decrypts the combined data (Step S231), sets the decrypted data in the write request including the converted address, and sends the write request to the memory controller 130 (Step S232).

The memory controller 130, when receiving the write request, writes the fraction data of the data item 1, and the data item 2 to the main memory 120 (Step S233), and notifies the CPU 140 about the completion of writing the data (Step S234).

The CPU 140, when notified about the write completion, offers a response to the host apparatus 200 in cooperation with the host interface controller 110 (Step S235).

On the other hand, the crypto processor 150 subtracts the size of the decrypted data from the DAM transfer size stored in its internal memory (Step S236), after having sent the write request. In this embodiment, assume that no fraction data remains as a result of decrypting the fraction data of the data item 1, and the data item 2.

The crypto processor 150 then determines whether the data transfer size has become 0 (Step S237). If the data transfer size has become 0, the crypto processor 150 sends the next read request for the descriptor 2 to the memory controller 130 (Step S238). Further, when the descriptor 2 is received from the memory controller 130 (Step S239), the RAID controller 100 performs the same processes as those subsequent to Step S209.

According to the present embodiment, the crypto processor 150 obtains the descriptor 2 including a DMA number for identifying a DMA channel used to transfer data. Based on the DMA number included in the obtained descriptor 2, the crypto processor 150 stores therein data transferred using the same DMA channel in units of the data size specified in PCIe. The crypto processor 150 then encrypts the stored data in units of the data size specified in the AES, and transfers the encrypted data to the disk interface controller 160, thereby enabling the encryption of the data for each channel by identifying the DMA channel used to transfer the data, even when the data size as a unit for data transfer differs from the data size as a unit for crypto processing.

According to the present embodiment, if data below the data size specified in the AES remains as a result of encrypting the stored data, the crypto processor 150 combines the remaining data with data subsequently transferred using the same DMA channel in units for the data size specified in PCIe, so as to store it therein. The crypto processor 150 then encrypts the stored data in units of the data size specified in the AES. The encryption of data is thus enabled by combining fraction data with the subsequent data, even when the data size as a unit for data transfer exceeds the data size as a unit for crypto processing.

According to the present embodiment, the crypto processor 150 receives from the disk interface controller 160 a data read request that requests the memory controller 130 to read out data and that includes a DMA number for identifying a DMA channel used to transfer the data. In this case, the crypto processor 150 determines whether the DMA number included in the data read request matches the obtained DMA number. If the DMA numbers match, the crypto processor 150 sends the data read request to the memory controller 130. The crypto processor 150 then encrypts data transferred from the memory controller 130 in response to the data read request thus sent. Accordingly, by setting information for identifying a DMA channel used to transfer data in a data transfer request, sent from the transfer destination before the data transfer, identification can be performed for a DMA channel used to transfer the data, enabling encryption of the data for each channel.

According to the present embodiment, the data read request received from the disk interface controller 160 includes an encryption requirement flag indicating whether to encrypt data requested in the data transfer request. Based on the encryption requirement flag, the crypto processor 150 determines whether to encrypt data transferred from the memory controller 130 in response to the data read request. If the crypto processor 150 determines to perform encryption, it encrypts the data. With this arrangement, data not required to be encrypted, for example, control data for controlling data transfer, is excluded from the crypto processing.

According to the present embodiment, the crypto processor 150 obtains the descriptor 2 including a DMA number for identifying a DMA channel used to transfer encrypted data. Based on the DMA number included in the obtained descriptor 2, the crypto processor 150 stores therein the encrypted data transferred using the same DMA channel in units of the data size specified in PCIe. The crypto processor 150 then decrypts the stored encrypted data in units of the data size specified in the AES, and transfers to the memory controller 130 the data decrypted in units of the data size specified in the AES. The decryption of the data for each channel is thus enabled by identifying a DMA channel used to transfer the data, even when the data size as a unit for data transfer differs from the data size as a unit for crypto processing.

According to the present embodiment, when data below the data size specified in the AES remains as a result of decrypting the stored encrypted data, the crypto processor 150 combines the remaining data with encrypted data subsequently transferred using the same DMA channel in units of the data size specified in PCIe, so as to store it therein. The crypto processor 150 then decrypts the stored encrypted data in units of the data size specified in the AES. The decryption of data is thus enabled by combining fraction data with the subsequent data, even when the data size as a unit for data transfer exceeds the data size as a unit for crypto processing.

The present embodiment describes an arrangement that the present invention is applied to the RAID controller. The present invention is not limited to this arrangement, and may similarly be applied to, for example, an arrangement that encryption and decryption are performed on data transferred between devices connected via a PCIe bus and constituting a data transfer controlling apparatus of various types.

The present embodiment describes an arrangement that the AES is used as an encryption format. The present invention is not limited to this arrangement, and may be applied similarly to an arrangement that the data size as a unit for crypto processing differs from the data size as a unit for data transfer via a bus even when an encryption format of other types is used.

Further, as to the processes described in the present embodiment as being performed automatically, all of or part of the processes may be performed manually. Alternatively, as to the processes described as being performed manually, all of or part of the processes may be performed automatically by known methods.

In addition, the processing procedures, controlling procedures, specific names, information including various kinds of data and parameters shown in the description and the drawings may be changed in any way unless otherwise specified.

Further, constituting elements of the apparatuses shown in the drawings indicate ideational functions, and their physical arrangements are not necessarily the same as those shown in the drawings. Thus, the arrangement of distributing and integrating the apparatuses is not limited to those specifically shown in the drawings, and all of or part of the apparatuses may be modified concerning the functional and physical aspects based on the given units with loads on and usage of the apparatuses taken into account.

According to an embodiment of the present invention, such an advantage is yielded that, even when a data size as a unit for data transfer differs from a data size as a unit for crypto processing, identification is performed for a channel used to transfer data, enabling encryption of data for each channel.

According to an embodiment of the present invention, such an advantage is yielded that, even when a data size as a unit for data transfer exceeds a data size as a unit for crypto processing, fraction data is combined with the subsequent data, enabling encryption of the data.

According to an embodiment of the present invention, the following advantage is yielded. By setting information for identifying a channel used to transfer data in the data transfer request sent from a transfer destination in advance before transfer of the data, identification can be made for a channel used to transfer the data, enabling encryption of the data for each channel.

According to an embodiment of the present invention, such an advantage is yielded that data not required to be encrypted, for example, control data for controlling data transfer, is excluded from the crypto processing.

According to an embodiment of the present invention, such an advantage is yielded that, even when a data size as a unit for data transfer differs from a data size as a unit for crypto processing, identification is performed for a channel used to transfer the data, enabling decryption of the data for each channel.

According to an embodiment of the present invention, such an advantage is yielded that, even when a data size as a unit for data transfer exceeds a data size as a unit for crypto processing, fraction data is combined with the subsequent data, enabling decryption of the data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data encryption apparatus that encrypts data and transfers the encrypted data from a first apparatus to a second apparatus, the data encryption apparatus comprising:
   a data storing unit; and
   a processor coupled to the data storing unit, wherein the processor executes a process including:
      storing data received from the first apparatus in a data storing unit
      setting transfer channel identification information for identifying a channel used to transfer data for each data stored in the data storing unit;
      reading out, based on the transfer channel identification information set by the setting, data stored in the data storing unit in a unit of a first data size;
      encrypting the read data in a unit of a second data size, and if data whose size is smaller than the second data size remains as a result the encrypting of the read data, holding remaining data without encryption; and transferring to the second apparatus the data encrypted in the unit of the second data size based on the transfer channel identification information, wherein
the transferring sends a data read request with the transfer channel identification information,
if the processor does not hold the remaining data after the encryption in the unit of the second data size when receiving a data transfer request processor reads out data based on the transfer channel identification information from the data storing unit and encrypts the read out data in a unit of a second data size,
if the processor holds the remaining data and transfer channel identification information included in a received data transfer request matches the transfer channel identification information or encryption of the remaining data when receiving the data transfer request the processor combines the read out data from the data storing unit with the remaining data and decrypts the combined data in the unit of the second data size, and
if the processor holds the remaining data and the transfer channel identification information included in the received data transfer request does not match the transfer channel identification information or encryption of the remaining data when receiving the data transfer request the processor reads out data from the data storing unit and encrypts the read out data in the unit of the second data size without combining the remaining data.

2. A data decryption apparatus that decrypts encrypted data and transfers the decrypted data from a second apparatus to a first apparatus, the data decryption apparatus comprising:
a memory; and
a processor coupled to the memory, wherein the processor executes a processor including:
setting transfer channel identification information for identifying a channel used to transfer encrypted data;
acquiring, based on the transfer channel identification information set by the setting transfer channel identification information, data stored in the second apparatus in a unit of a first data size;
storing, based on the transfer channel identification information set by the setting transfer channel identification information, data acquired by the acquiring;
decrypting the data acquired by the acquiring in a unit of a second data size, and if data whose size is smaller than the second data size remains as a result of decrypting the stored data, storing remaining data in a memory without decryption; and
transferring to the first apparatus the data decrypted in the unit of the second data size, wherein
the transferring sends a data transfer request along with data acquired from the first apparatus, the data transfer request being sent with the transfer channel identification information set by the setting transfer channel identification information,
if the processor does not hold the remaining data after the decryption in the unit of the second data size when the processor receives the data transfer request from the acquiring, the decrypting decrypts received data based on the transfer channel identification information in a unit of a second data size,
if the processor holds the remaining data and transfer channel identification information included in a received data transfer request matches transfer channel identification information included in the data transfer request at generation of the remaining data when receiving the data transfer request combining data based on the transfer channel identification information with remaining data and decrypting data in the unit of the second data size, and
if the processor holds the remaining data and transfer channel identification information included in the received data transfer request does not match transfer channel identification information included in the data transfer request at generation of the remaining data when receiving the data transfer request from the acquiring, decrypting data based on the transfer channel identification information in the unit of the second data size without combining the remaining data.

3. A data encryption method that encrypts data and transfers the encrypted data from a first apparatus to a second apparatus via a channel, the data encryption method comprising:
storing data received from the first apparatus in a data storing unit;
setting transfer channel identification information for identifying a channel used to transfer data by a channel information setting unit for each data stored in the data storing unit;
reading out, based on the transfer channel identification information set by the setting, data stored in the data storing unit in a unit of a first data size and storing the read data in a data encrypting unit;
encrypting the data stored in the data encrypting unit in a unit of a second data size, and if data whose size is smaller than the second data size remains as a result of encrypting the stored data, storing remaining data in a memory without encryption; and
transferring to the second apparatus the data encrypted in the unit of the second data size by the encrypting based on the transfer channel identification information set by the channel information setting unit, wherein
if the data encrypting unit does not store the remaining data after encryption in the unit of the second data size when the data encrypting unit receives the data transfer request by the transferring, the data encrypting unit reads out data based on the transfer channel identification information from the data storing unit and encrypts the read out data in a unit of a second data size,
if the data encrypting unit stores the remaining data and transfer channel identification information included in received data read request matches transfer channel identification information for encryption of the remaining data when the data encrypting unit receives the data transfer request from the transferring, combining the read out data from the data storing unit with the remaining data and decrypting combined data in the unit of the second data size, and
if the data encrypting unit stores the remaining data and the transfer channel identification information included in received data read request does not match the transfer channel identification information for encryption of the remaining data when the data encrypting unit receives the data transfer request from the transferring, reads out data from the data storing unit and encrypts the read out data in the unit of the second data size without combining the remaining data.

4. A data decryption method that decrypts encrypted data and transfers the decrypted data from a first apparatus to a second apparatus via a channel, the data decryption method comprising:

setting transfer channel identification information for identifying a channel used to transfer encrypted data;

acquiring, based on the transfer channel identification information set by the setting transfer channel identification information, data stored in the second apparatus in a unit of a first data size;

storing, based on the transfer channel identification information set by the setting transfer channel identification information, data acquired by the acquiring;

decrypting the data stored in the data decrypting unit in a unit of a second data size, and if data whose size is smaller than the second data size remains as a result of decrypting the stored data, storing remaining data in a memory without decryption; and transferring to the first apparatus the data decrypted in the unit of the second data size by the data decrypting unit, wherein if the data decrypting unit does not store the remaining data after the decryption in the unit of the second data size when the data decrypting unit receives the data transfer request from the acquiring, decrypting decrypts received data based on the transfer channel identification information in a unit of a second data size, if the data decrypting unit stores the remaining data and transfer channel identification information included in a received data transfer request matches transfer channel identification information for decryption of the remaining data when the data decrypting unit receives the data transfer request from the acquiring, combining data based on the transfer channel identification information with remaining data and decrypting combined data in the unit of the second data size, and if the data decrypting unit stores the remaining data and transfer channel identification information included in the received data transfer request does not match transfer channel identification information for decrypting of the remaining data when the data decrypting unit receives the data transfer request from the acquiring, decrypting data based on the transfer channel identification information in the unit of the second data size without combining the remaining data.

5. A data encryption method that encrypts data and transfers the encrypted data from a first apparatus to a second apparatus, the data encryption method comprising:

storing data received from the first apparatus in a data storing unit;

setting transfer channel identification information for identifying a channel used to transfer data for each data stored in the data storing unit;

reading out, based on the transfer channel identification information set by the setting, data stored in the data storing unit in a unit of a first data size;

encrypting the read data in a unit of a second data size, and if data whose size is smaller than the second data size remains as a result of encrypting the read data, holding remaining data without encryption; and transferring to the second apparatus the data encrypted in the unit of the second data size based on the transfer channel identification information, wherein the transferring sends a data read request with the transfer channel identification information, if the processor does not hold the remaining data after the encryption in the unit of the second data size when receiving a data transfer request, the processor reads out data based on the transfer channel identification information from the data storing unit and encrypts the read out data in a unit of a second data size, if the processor holds the remaining data and transfer channel identification information included in a received data transfer request matches the transfer channel identification information for encryption of the remaining data when receiving the data transfer request, the processor combines the read out data from the data storing unit with the remaining data and decrypts the combined data in the unit of the second data size, and if the processor holds the remaining data and the transfer channel identification information included in the received data transfer request does not match the transfer channel identification information for encryption of the remaining data when receiving the data transfer request, the processor reads out data from the data storing unit and encrypts the read out data in the unit of the second data size without combining the remaining data.

6. A data decryption method that decrypts encrypted data and transfers the decrypted data from a second apparatus to a first apparatus, the data decryption method comprising:

setting transfer channel identification information for identifying a channel used to transfer encrypted data;

acquiring, based on the transfer channel identification information set by the setting transfer channel identification information, data stored in the second apparatus in a unit of a first data size;

storing, based on the transfer channel identification information set by the setting transfer channel identification information, data acquired by the acquiring;

decrypting the data acquired by the acquiring in a unit of a second data size, and if data whose size is smaller than the second data size remains as a result of decrypting the stored data, storing remaining data in a memory without decryption; and transferring to the first apparatus the data decrypted in the unit of the second data size, wherein the transferring sends a data transfer request along with data acquired from the first apparatus, the data transfer request being sent with the transfer channel identification information set by the setting transfer channel identification information, if the processor does not hold the remaining data after the decryption in the unit of the second data size when the processor receives the data transfer request from the acquiring, the decrypting decrypts received data based on the transfer channel identification information in a unit of a second data size, if the processor holds the remaining data and transfer channel identification information included in a received data transfer request matches transfer channel identification information included in the data transfer request at generation of the remaining data when receiving the data transfer request, combining data based on the transfer channel identification information with remaining data and decrypting combined data in the unit of the second data size, and if the processor holds the remaining data and transfer channel identification information included in the received data transfer request does not match transfer channel identification information included in the data transfer request at generation of the remaining data when receiving the data transfer request from the acquiring, decrypting data based on the transfer channel identification information in the unit of the second data size without combining the remaining data.

* * * * *

UNITED STATES PATENT AND TRADEMARK OFFICE
CERTIFICATE OF CORRECTION

PATENT NO. : 8,321,659 B2
APPLICATION NO. : 12/003672
DATED : November 27, 2012
INVENTOR(S) : Terumasa Haneda It is certified that error appears in the above-identified patent and that said Letters Patent is hereby corrected as shown below:

Column 21, Line 8, In Claim 1, delete "request" and insert -- request, the --, therefor.

Column 21, Line 17, In Claim 1, delete "request" and insert -- request, --, therefor.

Column 21, Line 26, In Claim 1, delete "request" and insert -- request, --, therefor.

Column 22, Line 1, In Claim 2, delete "request" and insert -- request, --, therefor.

Signed and Sealed this
Fifth Day of March, 2013

Teresa Stanek Rea
*Acting Director of the United States Patent and Trademark Office*